US008321814B2

(12) United States Patent
Hawkins et al.

(10) Patent No.: US 8,321,814 B2
(45) Date of Patent: Nov. 27, 2012

(54) INTEGRATED HANDHELD COMPUTING AND TELEPHONY SYSTEM AND SERVICES

(75) Inventors: Jeffrey Charles Hawkins, Atherton, CA (US); Robert Yuji Haitani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 367 days.

(21) Appl. No.: 12/471,217

(22) Filed: May 22, 2009

(65) Prior Publication Data

US 2009/0271407 A1 Oct. 29, 2009

Related U.S. Application Data

(63) Continuation of application No. 11/231,631, filed on Sep. 20, 2005, now Pat. No. 7,555,727, which is a continuation-in-part of application No. 09/977,871, filed on Oct. 14, 2001, now Pat. No. 7,007,239, which is a continuation-in-part of application No. 09/668,123, filed on Sep. 21, 2000, now Pat. No. 6,781,575, which is a continuation-in-part of application No. 09/374,095, filed on Aug. 12, 1999, now Pat. No. 6,516,202.

(51) Int. Cl.
*G06F 3/14* (2006.01)
*H04M 1/00* (2006.01)

(52) U.S. Cl. ............... 715/864; 455/556.1; 455/566; 455/567; 455/575.3; 455/575.4; 455/411; 379/207.1

(58) Field of Classification Search .................. 715/716, 715/864; 455/556.1, 566–567, 575.3, 575.4, 455/411; 379/207.1
See application file for complete search history.

(56) References Cited

U.S. PATENT DOCUMENTS

| 5,491,784 | A | 2/1996 | Douglas et al. |
| 5,751,793 | A | 5/1998 | Davies et al. |
| 5,815,142 | A | 9/1998 | Allard et al. |
| 6,094,565 | A * | 7/2000 | Alberth et al. ............ 455/575.3 |
| 6,097,391 | A | 8/2000 | Wilcox |
| 6,215,993 | B1 * | 4/2001 | Ulveland ..................... 455/415 |
| 6,333,973 | B1 | 12/2001 | Smith et al. |
| 6,369,803 | B2 | 4/2002 | Brisebois et al. |
| 6,587,674 | B1 * | 7/2003 | Isberg et al. .............. 455/575.8 |

OTHER PUBLICATIONS

United States Office Action, U.S. Appl. No. 11/354,414, Apr. 9, 2010, 12 pages.
United States Office Action, U.S. Appl. No. 11/354,414, Sep. 16, 2009, 10 pages.
United States Office Action, U.S. Appl. No. 11/496,089, Oct. 19, 2009, 8 pages.
United States Office Action, U.S. Appl. No. 11/354,414, Sep. 30, 2010, 13 pages.

* cited by examiner

*Primary Examiner* — Michael Roswell
*Assistant Examiner* — Sajeda Muhebbullah

(57) ABSTRACT

Disclosed is an integrated handheld computer and telephony system. Integration of the handheld computer and telephony system is at the physical and operational level. For example, the integrated handheld computer and telephony system physically integrates a handheld computer with a mobile (e.g., cellular) telephone. In addition, the handheld computer is distinct from telephony system in that they are logically separable. However, they are also operationally integrated, for example, the telephony system executes a telephone application on the processor of the handheld computer. Likewise, the handheld computer can execute applications, for example, a phone book, that can be used to launch the telephony application.

12 Claims, 28 Drawing Sheets

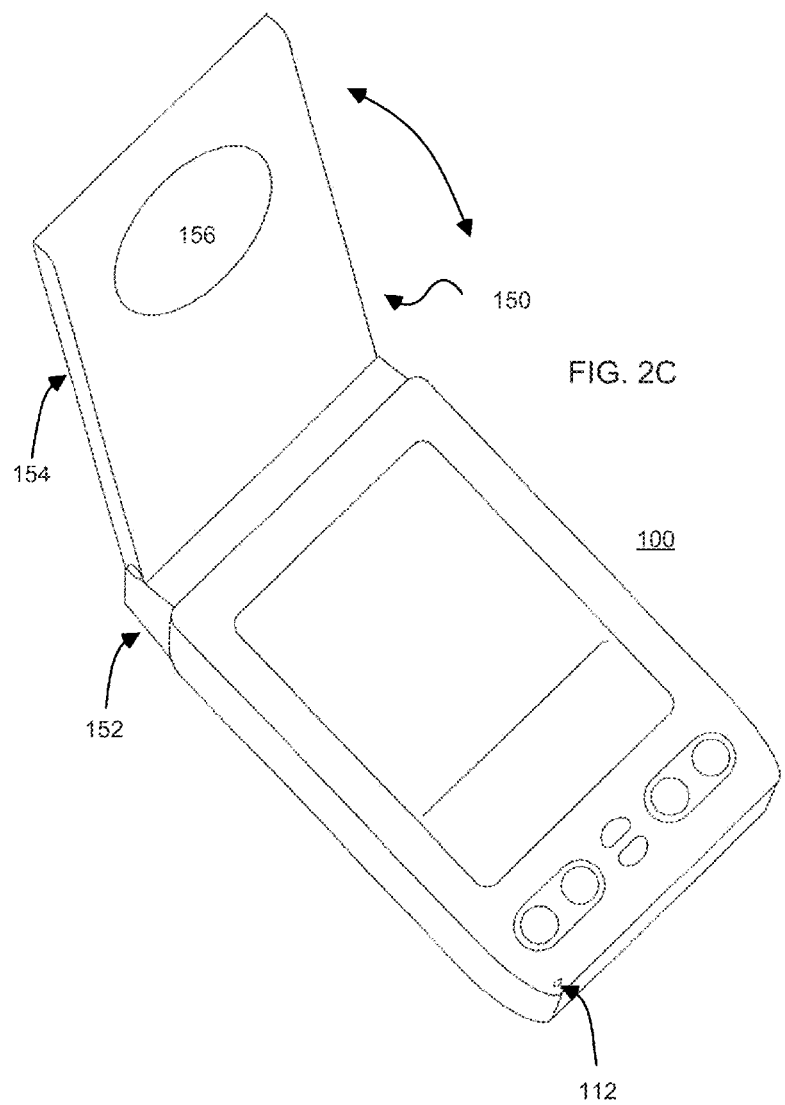

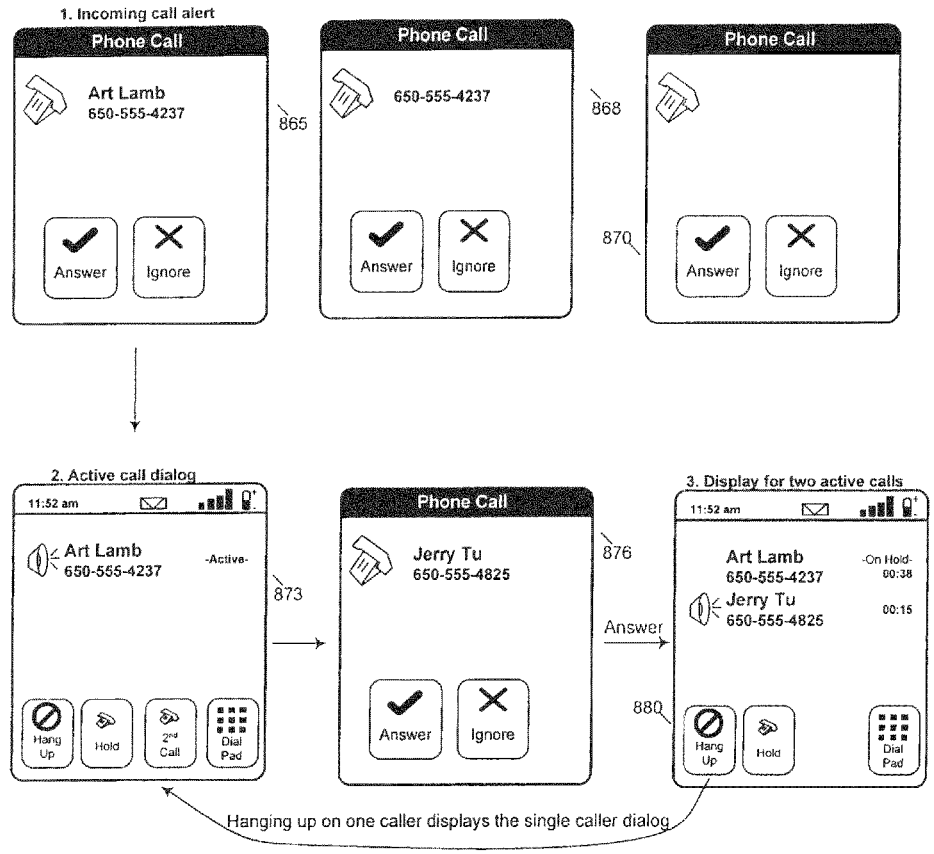
FIG. 8B
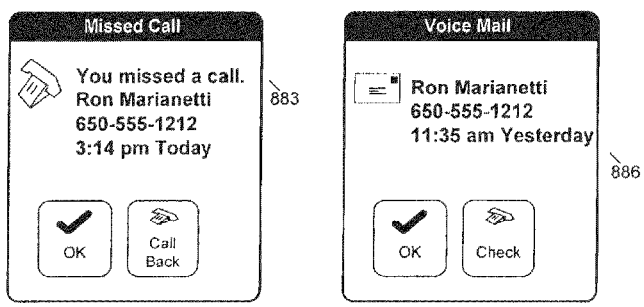

INTEGRATED HANDHELD COMPUTING AND TELEPHONY SYSTEM AND SERVICES

CROSS REFERENCE TO RELATED APPLICATIONS

This patent application is continuation, and claims a benefit and priority to U.S. patent application Ser. No. 11/231,631, filed on Sep. 20, 2005, titled "Integrated Handheld Computing and Telephony System and Services," which is a continuation-in-part of, and claims a benefit and priority to, U.S. patent application Ser. No. 09/977,871, filed Oct. 14, 2001, titled "Method and Apparatus for Accessing a Contacts Database and Telephone Services", now U.S. Pat. No. 7,007,239, which is a continuation-in-part of and claims a benefit of U.S. patent application Ser. No. 09/668,123, filed Sep. 21, 2000, titled "Method and Apparatus for Organizing Addressing Elements", now U.S. Pat. No. 6,781,575, and a continuation-in-part of and claims a benefit of U.S. patent application Ser. No. 09/374,095, filed Aug. 12, 1999, titled "Mobile Computer System Designed for Wireless Communication Expansion", now U.S. Pat. No. 6,516,202, the relevant contents of each of these applications herein being incorporated by reference.

BACKGROUND OF THE INVENTION

1. Field of the Invention

The present invention relates to the field of mobile computer systems, and more particularly, to handheld computer system that includes a configuration for a wireless data and voice communications.

2. Description of the Related Art

Handheld information organization and communications devices are becoming increasingly popular for both business users and more general users. For example, handheld systems such as a personal digital assistant (PDA) offered by Palm, Inc. (Sunnyvale, Calif.) or Hewlett-Packard (Palo Alto, Calif.) have found widespread acceptance amongst people for the purpose of organizing their calendars and storing personal contact information. Typically, these PDAs contain Personal Information Management (PIM) applications such as an address book, a calendar application, a memo application, and a to-do list application. The popularity of these devices is due in part to their small form factor and operational readiness (no "boot" time required). Thus, PDAs allow convenient and instant access to a large amount of personal information.

Over time, research has indicated that having a simple intuitive method of quickly accessing the personal information data is a feature of importance for many users of a PDA. Operating systems designed around this principle, for example, the Palm Operating System (PalmOS) from Palm Source, Inc. (Sunnyvale, Calif.), have captured a large proportion of the PDA market. An advantage of such operating systems is the flexibility with which a user can select and manipulate data in a number of different ways. For example, a user may use up/down scroll buttons, can select an item displayed on a touch screen, and/or scroll through different category lists by repeatedly pressing an application button. In some contexts, such as an address book application, this allows a user to store and access a list of acquaintances and contact details relatively quickly and efficiently. Nevertheless, there continues to be a need for a new, useful interface that allow a user to select and arrange items in such lists quickly and in a simple manner.

In addition to a PDA, many users also consider a cellular telephone to be an essential tool. Hence, many users have both a PDA and a cellular telephone. The PDA provides functionality such as use as PIM organization. As an example of how a user uses both devices, if a user has a call scheduled with a contact, the time of that call may be noted in a calendar of the PIM. When the user is ready to initiate the call, the user references the contact's telephone number in the address book of the PIM and thereafter dials that contact on the cellular telephone. The need to consult and interact with two separate devices is inconvenient as both time-consuming and cumbersome.

One attempt to address these shortcomings was the pdQ Smartphone from QUALCOMM Incorporated (San Diego, Calif.), which is illustrated in FIG. 1A. The pdQ Smartphone includes a display indicator showing telephone mode status. The pdQ Smartphone also includes a closed keypad with push-buttons for dialing telephone numbers, as well as status lights, a speaker, and a microphone. FIG. 1B illustrates another view of the pdQ Smartphone. In this view, the keypad of the pdQ Smartphone is shown in an opened position exposing an organizer. The organizer includes a screen, a writing area, and soft buttons.

Although the pdQ Smartphone combines some of the functionality of an organizer and a cellular telephone, it includes number of drawbacks. One drawback is it requires a separate dialing keypad for telephone functions and a separate input area for the PDA. This increase device form factor and increases device manufacturing costs associated with the separate dialing keypad. Another drawback is the pdQ Smartphone lacks external control functions not directly related to operation of the phone or the PDA portion, but applicable to both. For example, there is no mechanism to control speaker functions when the phone is not operational.

Yet another drawback is many users have two or more voicemail accounts, e.g., cellular phone, work, and home, which limits operational effectiveness of devices such as the pdQ Smartphone because it provides options for use with only a single voicemail account. Still another drawback is the pdQ Smartphone allowed access to networks, e.g., the Internet, but only through a dialing option. Devices thereafter have allowed for access to networks such as the Internet through general packet radio service (GPRS) or a wireless network connection, e.g., IEEE 802.11, but requires software to control radio operation functions such as ON and OFF. This can be inconvenient because it requires the user to navigate through user interface menus or buttons, which may not be intuitive and could be relatively time consuming.

Therefore, there is a need for an improved apparatus and method for combining the functionality of a handheld computing device and a telephone.

SUMMARY OF THE INVENTION

The disclosed embodiments also include a handheld computing system, e.g., an organizer, that integrates mobile (e.g., cellular) telephony functionality. The handheld computing system is configured to function with the telephony features.

One disclosed embodiment includes a corresponding user interface for an integrated handheld computer computing and telephone system. By way of example, a telephone system user interface is configured to provide a familiar user interface to the user. In one embodiment, a user is presented with an option of a predetermined number, e.g., four, available user interface views and yet another user interface view, e.g., a fifth view, that is available when there is an active telephone call. These views are displayed on a digitizer pad, or example, a "touch" sensitive display (e.g., pressure-sensitive (resistive), electrically-sensitive (capacitance), acoustically-sensitive (SAW—surface acoustic wave) or photo-sensitive (infrared)) and can be interacted with through the display itself.

An embodiment of a first user interface view includes a dial pad view that is similar to a common touch tone dial pad. However, the dial pad view has added functionality and may automatically switch to other views as needed. A second available user interface view includes a speed dial view. The speed dial view allows users to easily create their own customized speed dial buttons that are easy to navigate between and can be edited at any time. The system may automatically switch from the speed dial view in certain circumstances.

A third user interface view includes a call history view. The call history view displays a list of previous incoming, outgoing, or missed calls and may be filtered as desired. As with the previous two views, the system may automatically switch from the call history view to another user interface view as necessary. A fourth user interface view includes a contacts view. The contacts view provides a filtering mechanism that allows the user to search quickly and intuitively through a large personal contacts database. A fifth user interface view includes the active call view. The active call view displays a set of command buttons for accessing advanced telephone features during a telephone call such as hold, three-way calling, DTMF touch tones, hang-up, speakerphone, etc.

The disclosed embodiments provide a fully functional input mechanism that appropriately corresponds to applications operating in a handheld computing configuration or a telephony configuration. This provides users with a familiar, easy to use interactive input mechanism without comprising functionality of the familiar input mechanism. Moreover, the automated switch over between user interfaces depending on whether the application is handheld computer (e.g., data) related or telephony related further increases ease of use and operation. In addition, other disclosed features and embodiments further allow for operational efficiency and ease of use of the integrated handheld computer and telephony system. For example, multiple voicemail management, radio transmission management for data communication, and interface management.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter

BRIEF DESCRIPTION OF THE DRAWINGS

The disclosed embodiments have other advantages and features which will be more readily apparent from the following detailed description and the appended claims, when taken in conjunction with the accompanying drawings, in which:

FIG. 2C illustrates one embodiment of a front isometric view of the handheld computer system of FIGS. 2A and 2B equipped with a wireless communications peripheral attachment.
FIG. 8B illustrates one embodiment of screen shots as the system is navigated through an incoming call alert.

DETAILED DESCRIPTION OF THE PREFERRED EMBODIMENTS

In the following description, for purposes of explanation, specific nomenclature is set forth to provide a thorough understanding of the present invention. However, it will be apparent to one skilled in the art that these specific details are not required in order to practice the present invention. For example, the present invention has been described with reference to handheld computer and mobile ("cellular") telephone systems. However, the same techniques can easily be applied to other types of telephony devices such as non-mobile telephone systems.

Handheld Computer and Wireless Communication Devices

Figures (FIGS.) 2A and 2B illustrate one embodiment of a handheld computer system 100. As illustrated in Figure (FIG.) 2A, the front of the handheld computer system includes a display area 120 and several physical buttons 130. The display area 120 includes a visual display device, such as a liquid crystal display for presenting information to the user. A user may manipulate the physical buttons 130 to input information into the handheld computer system 100 and make selections of information presented on the display area 120. In a preferred embodiment, the display area 120 may also be covered with a digitizer pad that can be utilized by the user to enter information to the computer system using, e.g., a stylus (not shown) or a finger.

In operation of the preferred embodiment, the display area 120 displays information to the user of the handheld computer system 100. The user is then able to employ, e.g., a stylus, a finger, or inductive pen, to manipulate and interact with the displayed information by touching the digitizer pad overlaid on top of the display device. In one mode of operation, a stylus can be used in the manner of a writing pen to enter characters and figures by drawing the stylus across the digitizer pad.

In one embodiment, the user is instructed to enter text into a specific area 125 of the digitizer pad. The stylus and digitizer may function like a computer mouse to operate and manipulate interactive elements on the display. For example, the computer system may present a virtual button in a location on the display that can be activated to perform an associated function by the user tapping the stylus or a finger on the digitizer pad at the virtual button location. The stylus can also be used to perform "drag and drop" operations in the fashion known in the use of a computer mouse.

Figure 1A:
FIG. 1A illustrates a prior art phone in a closed position.
Figure 1B:
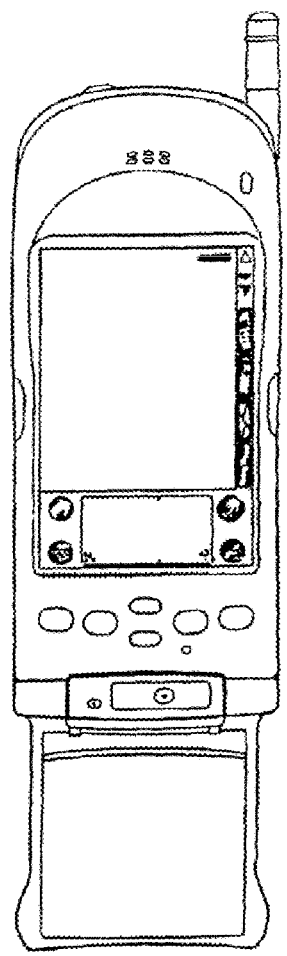
FIG. 1B illustrates the prior art phone in an open position.
Figure 2A:
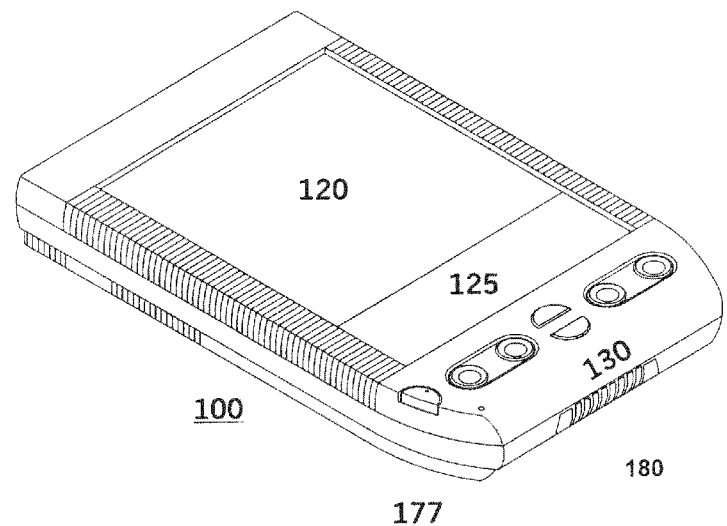
FIG. 2A illustrates one embodiment of a front isometric view a handheld computer system on which an embodiment of the present invention may be implemented.
Figure 2B:
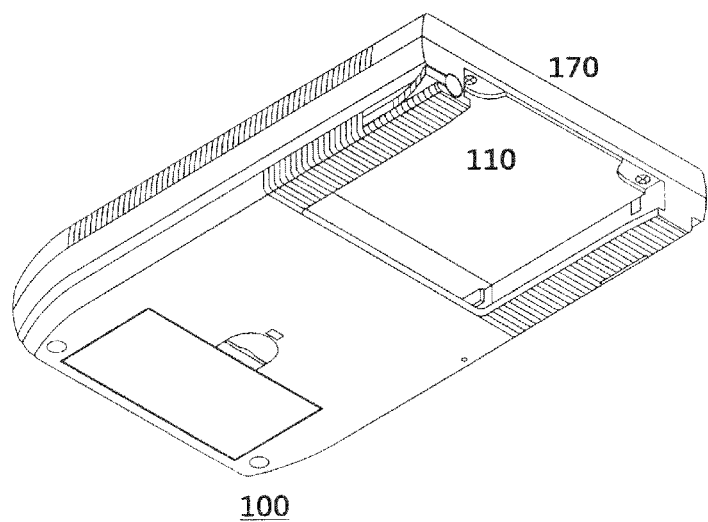
FIG. 2B illustrates one embodiment of a rear isometric view of the handheld computer system of FIG. 2A.

The handheld computer system 100 also includes an expansion connector slot 110, seen in a rear view of FIG. 2B. The expansion connector slot allows peripheral devices to be connected to the computer system to interact therewith. Many kinds of peripheral devices can be connected to the handheld computer system 100 through the expansion connector slot 110 including, GPS receivers, memory modules, pager modules, and cellular telephone transceivers.

FIG. 2C illustrates an isometric view of a handheld computer system 100 as described above, with a cellular telephone transceiver 150 coupled thereto by the expansion connector slot 130. The cellular telephone transceiver 150 comprises a first portion 152 that is fixed to the body of the handheld computer system and a second portion 154. The second portion 154 of the radio telephone device is hingedly coupled to the first portion 152 to allow it to pivot from a closed position where it covers the display area 120 to an open position as shown in FIG. 2C. When in the open position, a speaker 156 in the second portion of the cellular telephone transceiver 150 can be held proximate to the ear of the user while the user speaks into a microphone 112 provided in the handheld computer system 100.

The cellular telephone transceiver 150 includes circuitry for enabling communications with a cellular telecommunications network and processing circuitry that, together with onboard software or firmware, allows the cellular telephone transceiver 150 to interact with the handheld computer system 100. Various aspects of a handheld computer system and interconnected cellular radio telephone are described in U.S. Pat. No. 6,516,202) and entitled "A Mobile Computer System Designed for Wireless Communication Expansion", which is hereby expressly incorporated herein by reference.

It will be appreciated that the handheld computer system 100 and functions of the cellular telephone transceiver 150 operate principally under the control of computer software. The handheld computer system 100 includes a microprocessor and built-in software that provides application programs for the user. The cellular telephone transceiver 150 may also include a microprocessor, together with software code and data specifically required for the telephone functions.

In a preferred embodiment, a computer software phone application that provides the user interface functions for the cellular telephone transceiver peripheral 150 executes on the handheld computer system microprocessor. However, the software code may be permanently stored in either the handheld computer or the cellular telephone transceiver peripheral 150. Similarly, data used by the phone application can be stored in either device, although it is preferred that acquaintance contact data and the like be stored in the handheld computer system so that it may be accessible by the user even when the cellular telephone transceiver peripheral 150 is coupled to the handheld computer system 100.

Integrated Handheld Computer and Wireless Communication Devices

Figure 3B:
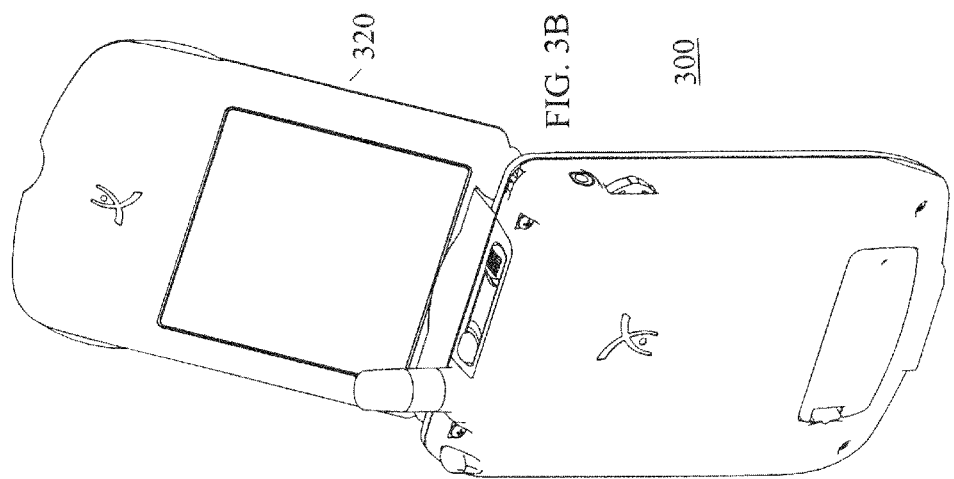
FIG. 3B illustrates one embodiment of a rear isometric view of an integrated keyboard-based handheld computer and cellular telephone system.
Figure 3A:
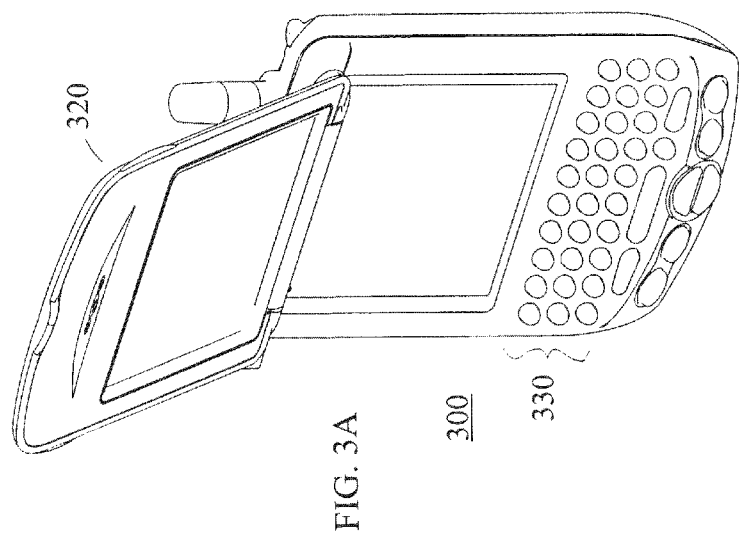
FIG. 3A illustrates one embodiment of a front isometric view of an integrated stylus-based handheld computer and cellular (or mobile) telephone system.

To reduce the number of devices that a user needs to carry around, an integrated handheld computer systems and cellular (or mobile) telephones is introduced. FIGS. 3A and 3B illustrate one embodiment of an integrated handheld computer and cellular telephone system 300. The integrated handheld computer and cellular telephone system 300 includes a keyboard 330 such that the user may easily enter names, addresses, phone numbers, and email messages into application programs running on the integrated handheld computer and cellular telephone system 300.

Figure 3C:
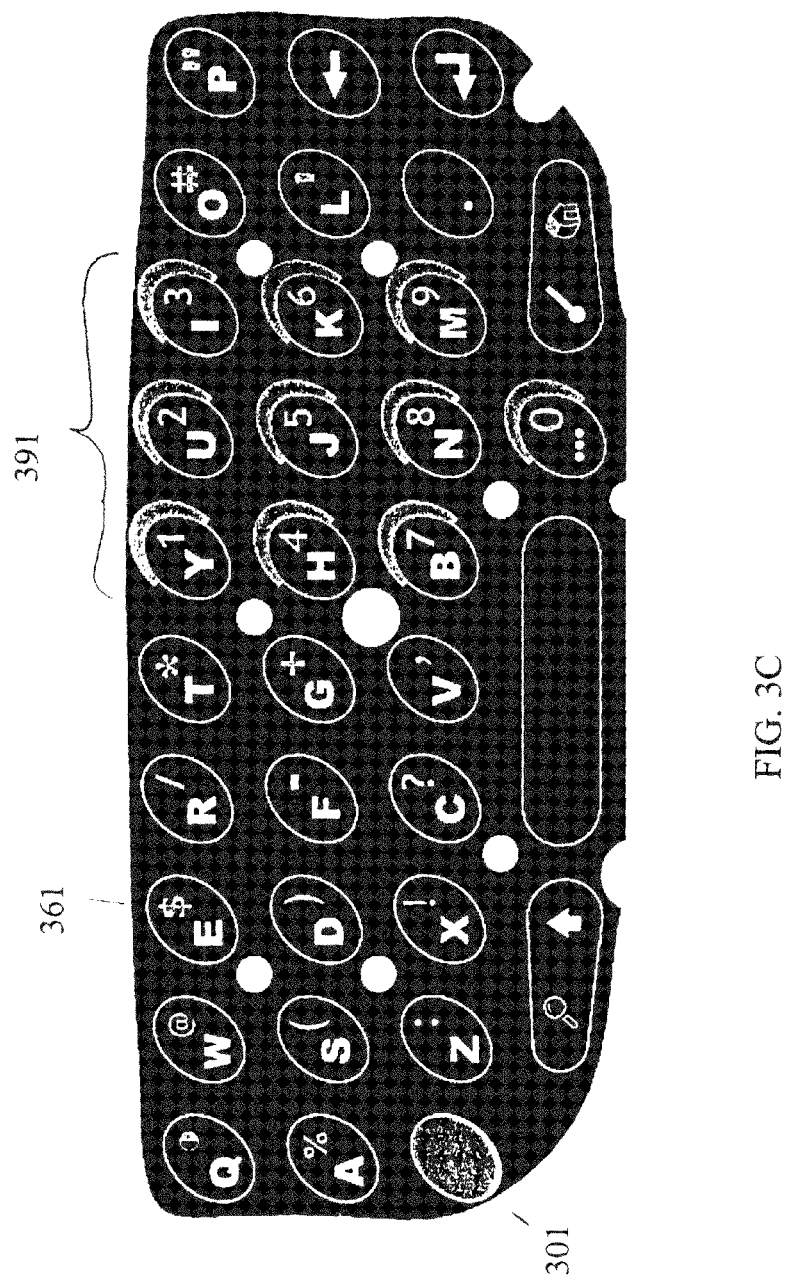
FIG. 3C illustrates one embodiment of a keyboard layout for the handheld computer and cellular telephone system of FIGS. 3A and 3B.

FIG. 3C illustrates one embodiment for the keyboard (or keypad) 330 that may be used in the handheld computer and cellular telephone system 300 of FIGS. 3A and 3B. The illustrated keyboard 330 is configured in a conventional 'QWERTY' layout. The keyboard of FIG. 3C includes an option key that is used to generate secondary characters from the various keys. For example, the "E" key 361 normally generates an "E" character. But if the "E" key 361 is pressed while simultaneously holding the option key 301, then the "$" character will be generated.

The keyboard of FIG. 3C also includes a digit dial pad area 391. The digit dial pad area 391 is laid out like a conventional touch-tone telephone dial pad. In this manner, a user may dial telephone numbers using the familiar mechanical touch-tone telephone dial pad. Note that the digit dial pad area 391 uses the same keys used for various letters. To explicitly generate a number, a user should press the option key 301 in order to generate a numerical digit from the keys in the digit dial pad area 391. However, the software in the handheld computer and cellular telephone system 300 may interpret any key press in the digit dial pad area 391 as a numerical digit in certain contexts whether or not the option key 301 is depressed. For example, if the user is entering a telephone number in a telephone number input field of a contact record, any key press from the digit dial pad area 391 will be interpreted as a numerical digit whether or not the option key 301 is depressed.

In an alternate integrated handheld computer and cellular telephone embodiment (not shown), the alternate integrated handheld computer and cellular telephone system lacks the keyboard 330 of FIG. 3A. In such an embodiment, the user enters text and numerical information using a stylus as set forth in the handheld computer system of FIGS. 2A through 2C.

Figure 5A:
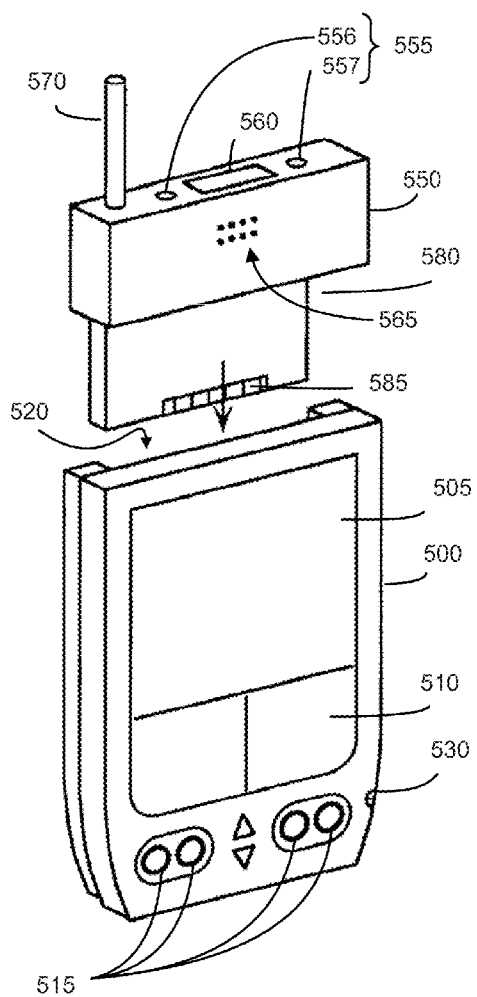
FIG. 5A is an exploded view of one embodiment of the telephony configuration.
Figure 5B:
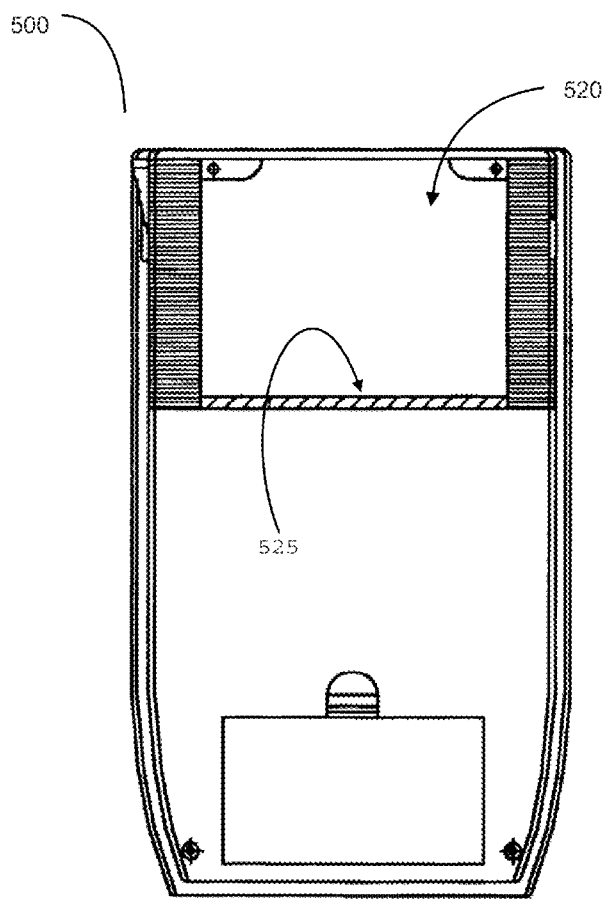
FIG. 5B is a back view of the handheld computer system.

Referring ahead to FIGS. 5A and 5B, FIG. 5A is an exploded view of one embodiment of the telephony configuration. This embodiment is described in the context of an organizer type handheld computer system. In this embodiment, a telephone includes two components, an organizer component 500 and the cellular component 550. The organizer component 500 includes a screen 505. The screen 505 may display text, images, or software generated keys, which are drawn on the screen. The screen 505 may display other types of information as well.

The organizer component 500 further includes a writing area 510, on which a user may enter information. For one embodiment, the user may also enter information by writing directly on screen 505. The handheld computer system 500 further includes keys 515 for controlling the display of the handheld computer system 500. In one embodiment, the keys 515 may be set to bring up various applications. In one embodiment, the keys 515 may be user programmable.

The organizer component 500 also includes a serial connection to couple the organizer to a host computer system. In one embodiment, the serial connection may be used to synchronize the organizer with the computer system. In one embodiment, the serial connection is a Universal Serial Bus (USB) connection. In another embodiment, the serial connection is an RS-232 connection. Alternative types of connections also may be used.

The organizer 500 further includes a void 520 in the back area of the organizer 500. The void 520 is designed to receive an extra element. For one embodiment, the extra element may be a simple place holder. In another embodiment, the extra element may be something else. The void 520 includes a connection portion 525. The connection portion 525 leads signals and other connections from the organizer component to the void 520. FIG. 5B is a back view of the organizer, showing the connection portion 525 at the bottom of the void 520.

In one embodiment, at least some of the connections may be connected from the processor on the organizer component. In one embodiment, at least one connection may be directly coupled from the serial connection of the organizer component, used for synchronizing the organizer with a computer system. For one embodiment, the connection portion 525 is designed to mate with the extra element placed in the void 520. In one embodiment, the organizer 500 further includes a microphone 530. The input of the microphone 530, for one embodiment, is coupled directly to the connection portion 525, such that any sound picked up by the microphone is transmitted to the extra element that is connected to the connection element 525 of the organizer 500.

In one embodiment, a cellular element 550 is the extra element that may be coupled into the void 520. The cellular element 550 includes a control button 555, for one embodiment, a power button. In one embodiment, the control button 555 may have multiple functionalities, or there may be multiple control buttons 555.

In one embodiment, the cellular element includes a voice connection button 556 and a data connection button 557. The voice connection button 556 is used to initiate a voice connection, to receive or place a voice telephone call. For one embodiment, when the user pushes the voice connection button 556 a dialing screen is displayed, permitting the user to select a telephone number for a voice connection. The data connection button 557 is used to initiate a data connection, for access to the World Wide Web, e-mail, fax, or other data transfer. When the user pushes the data connection button, a data screen is displayed, permitting the user to connect to e-mail, the Web, a fax interface, or other data interface.

The cellular element 550 further may include a status indicator 560. The status indicator 560 may be a light, a display panel, or other indicator of status. In one embodiment, the status indicator 560 may include multiple lights or other indicators. For one embodiment, if the status indicator 560 is a single light that can display multiple colors such that different colors indicate different statuses.

The cellular element 550 may further include an antenna 570 and a speaker 565. The cellular element 550 includes a connector 585. A lower portion 580 of the cellular element 550 is sized such that it fits into the void 520 of the organizer 500. When the lower portion 580 is inserted into the void 520, the connector 585 is coupled to the connection portion 525, thereby completing a circuit. Signals are thus routed between the cellular element 50 and the organizer 500. The cellular element 550, for one embodiment, does not include a microphone. Rather, when the cellular element 550 is mated to the organizer 500, the microphone 530 in the organizer 500 is used by the cellular element 550.

Example Telephony and Data Configurations

Figure 4:
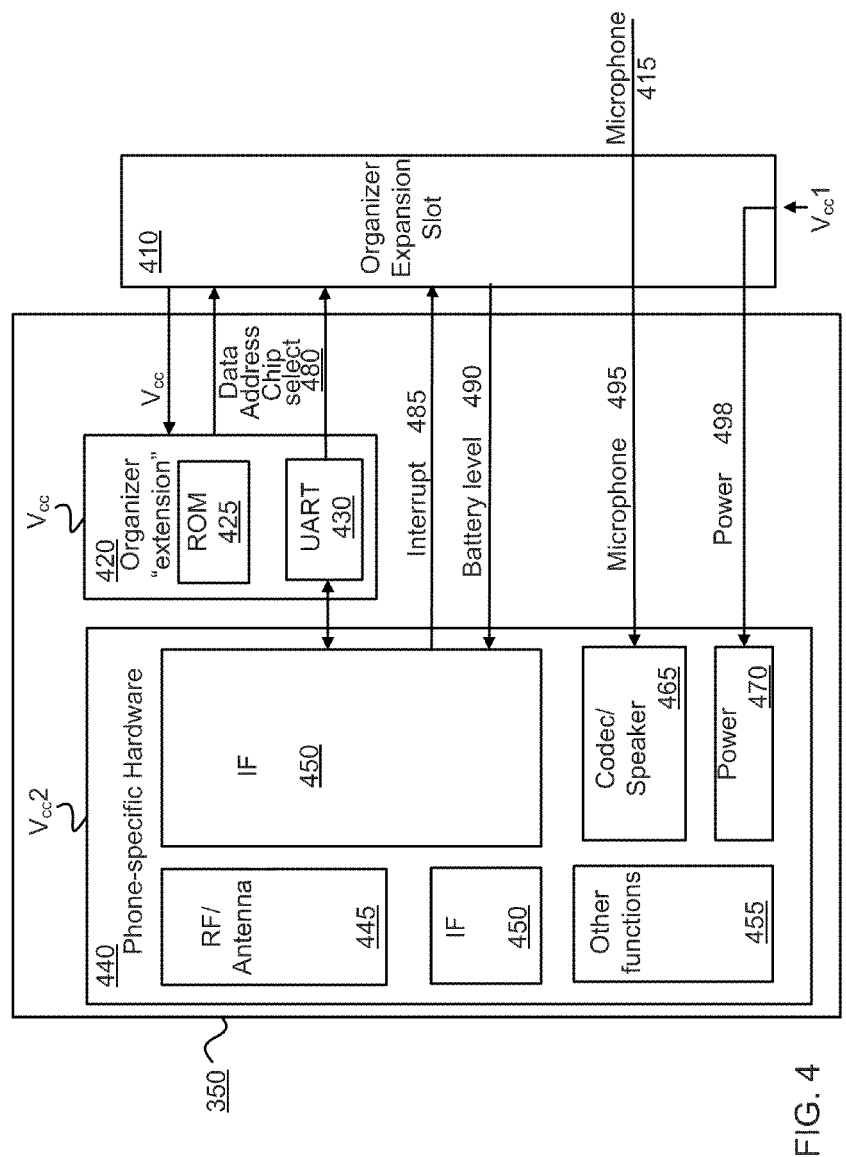
FIG. 4 illustrates one embodiment of a block diagram of hardware elements of a telephony portion of a handheld computer system.

FIG. 4 illustrates one embodiment of a block diagram of hardware (e.g., solid state) elements of a telephony portion of a handheld computer system. In one embodiment, the telephony portion can be a separate physical unit that couples through an expansion slot 410 is the connection portion 110 of the first embodiment of the handheld computer system 100. In another embodiment, the telephony portion is integrated with the remainder of the handheld computer system, for example as previously illustrated and described with respect to FIGS. 3A and 3B. By way of example, the telephony portion will be described in the context of the separate physical unit with respect to FIG. 4, although the principles of operation are applicable for the integrated telephony and handheld computer system embodiment. The example in FIG. 4 of the handheld computer system 100 may also be referenced as a personal digital assistant or organizer.

In FIG. 4, the expansion slot 410 is coupled to the organizer extension 420. The organizer extension 420 is hardware which is part of the cellular element, but is under the control of the organizer, and behaves as an extension of the organizer. The organizer extension 420 includes read only memory (ROM) 425, and a bidirectional communication medium. For one embodiment, the bidirectional communication medium is a Universal Asynchronous Receiver Transmitter (UART) 430. For another embodiment, the bidirectional communication medium may be a FIFO, Dual-port, RAM, registers, or other such devices. The ROM 425 includes the code to install a portion of the software on the organizer to allow the organizer to interface with the cellular element, and to uninstall the installed software. For one embodiment, the ROM 425 further includes software which is executed in-place by the organizer.

The phone specific hardware 440 is the hardware in the cellular element that is used to control specific telephone functionalities. The phone specific hardware 440 may include: a radio frequency (RF)/antenna 445, an IF logic 450, a power connection 470, a coder/decoder/speaker unit 465, a microcontroller 460, and other functions 455. For one embodiment, the microcontroller 460 includes a digital signal processor (DSP). The microcontroller 460 interfaces with the organizer, via the organizer extension slot 410 and the UART 430. The microcontroller 460 also controls the functions of the other elements of the cellular element. The microcontroller 460 sends an interrupt signal 485 to the organizer when a telephone call is received. For one embodiment, the "telephone call" can include voice, data, or fax connections.

For one embodiment, the microcontroller 460 also monitors the battery level signal 490. If the battery level signal 490 indicates that the organizer does not have a battery in or if the battery level is below a threshold, the microcontroller 460 does not send the interrupt signal 485. Generally, when a call is received, the organizer is asked to respond. Using the battery level signal 490, the organizer is not asked to respond when the battery level is below the threshold. This prevents the stand-by power from being exhausted, possibly leading to memory loss.

The codec/speaker 465 receives a microphone signal 495 from the organizer expansion slot 410. For one embodiment, the microphone signal 495 is connected directly through the organizer from a microphone 415 in the organizer. The organizer itself does not touch the microphone signal 495, but merely passes it to the codec/speaker 465. The speaker itself is in the cellular element. In this way, the microphone 415 in the organizer is integrated into the codec/speaker 465 in the cellular element.

The power 470 is a battery or other device configured to maintain power to the microcontroller 460 and the other elements of the cellular element. The power 470, for one embodiment, receives a power connection 498 from the organizer. The power connection 498 may provide auxiliary power, operational power, or charging power to the cellular element. For one embodiment, the power connection 498 is connected through the organizer expansion slot 410, to an organizer cradle slot. One of the interconnections between the organizer and the cradle is a power connection. This power connection is routed through the organizer, without being used within the organizer, to couple the power signal 498 to the power element 470, when the cellular element is coupled to the organizer. The power connection is used to charge the battery in the cellular element. For one embodiment, the power element 470 may further include a backup power source, such as a battery or capacitor, to maintain memory or otherwise maintain necessary data within the phone-specific hardware 440, if the cellular element has not been charged in some period.

Figure 6:
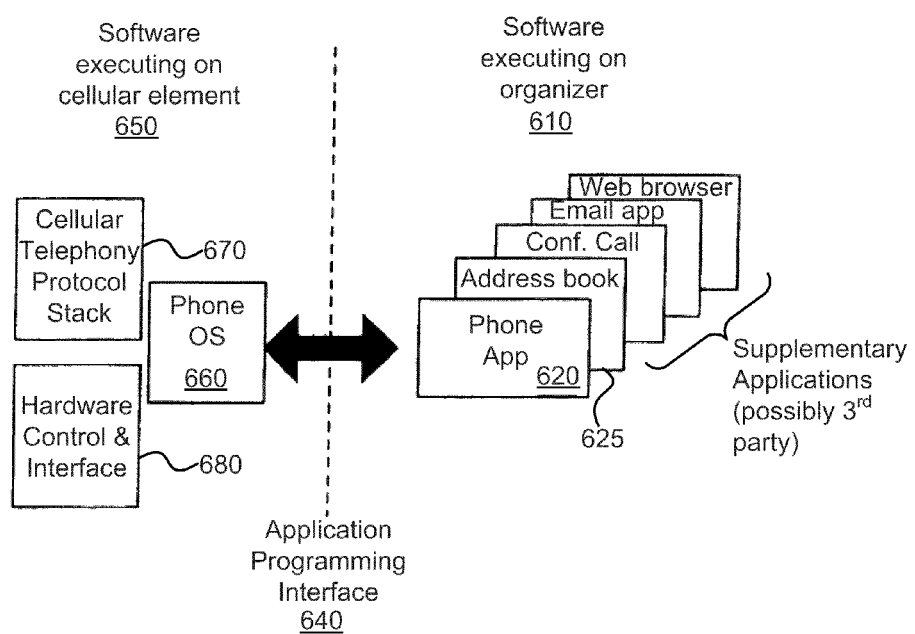
FIG. 6 illustrates one embodiment of a block diagram of the software elements of the cellular element's system.

FIG. 6 illustrates one embodiment of a block diagram of the software elements of the cellular telephony system. The software includes program code (instructions) that executes on the handheld computer (e.g., organizer) 610 and software that executes on the cellular element 650. In one embodiment, the software that executes on the handheld computer system may be executed in place from the cellular component's memory. In another embodiment, the software that executes on the handheld computer system may be uploaded to the handheld computer system memory, and executed from there.

The software that executes on the handheld computer system includes a phone application 620. The phone app 620 controls the user interface, database, and system level operations of the cellular element. The software may further be configured to include an address book 625. In one embodiment, the address book changes format when the cellular element couples with the organizer. For example, the address book displays a single-key dialing ability when the cellular element couples the handheld computer portion (physically, if a separate component, or logically, if an integrated component).

Other applications 630, such as conference calling, e-mail, web browser, etc. may be part of the software that runs on the handheld computer system. Any application that is altered by the connection of the cellular element with the handheld computer would be included in this list. The software that executes on the cellular element 650 interfaces with the software that executes on the handheld computer using an application programming interface (API) 640. For one embodiment, the API 640 runs over serial communications, over the bi-directional communications medium.

For one embodiment, the software that executes on the cellular element 650 runs on the microcontroller in the cellular element. For one embodiment, the software that executes on the cellular component 650 includes the phone operating system (OS) 660, cellular telephony protocol stack 670, and hardware control and interface 680. The cellular telephony functions include the cellular protocol stack, frequency/code selection, control of data services, etc. In one embodiment, functions directly related to making a connection to the network are handled in the software that executes on the cellular component 650. Functions for database management, storing and retrieving information about the connection, etc. are executed on the handheld computer.

Figure 7:
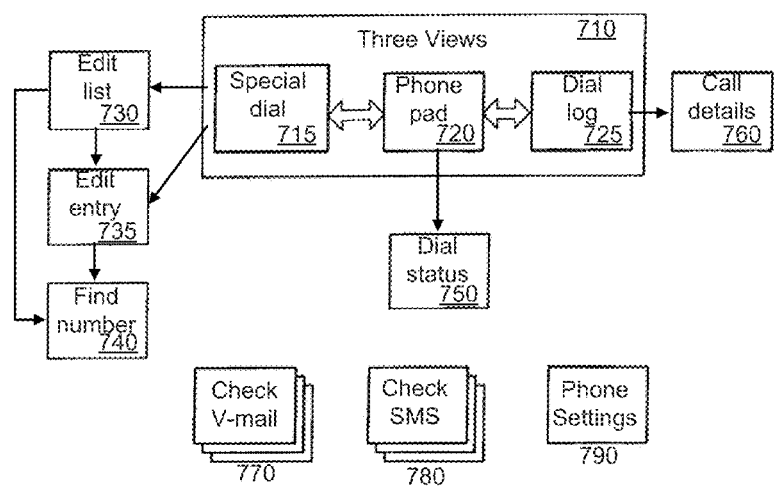
FIG. 7 illustrates one embodiment of the screen options of a handheld computer system.

FIG. 7 illustrates one embodiment of the screen options of a handheld computer system. The base views 710 include three screens, the speed dial screen 715, phone pad 720, and dial log 725. The speed dial screen 715 permits access to an edit screen 730, on which the user can edit the list of speed-dialed numbers, an edit entry screen 735 which permits editing of an existing entry, and a find number screen 740 which permits a search of existing telephone numbers, in the address book and elsewhere, to add to an entry.

The phone pad 720 includes software generated numbers to dial. The dial status screen shows the status of current calls. The dial log screen 725 includes a log of past dialed and/or received telephone calls. The dial log screen 725 permits access to the call details screen 760. The dial status screen 750 displays information about an ongoing call or calls. In one embodiment, the dial status screen 750 is automatically displayed on the viewer screen whenever a voice call(s) is established.

Figure 8A:
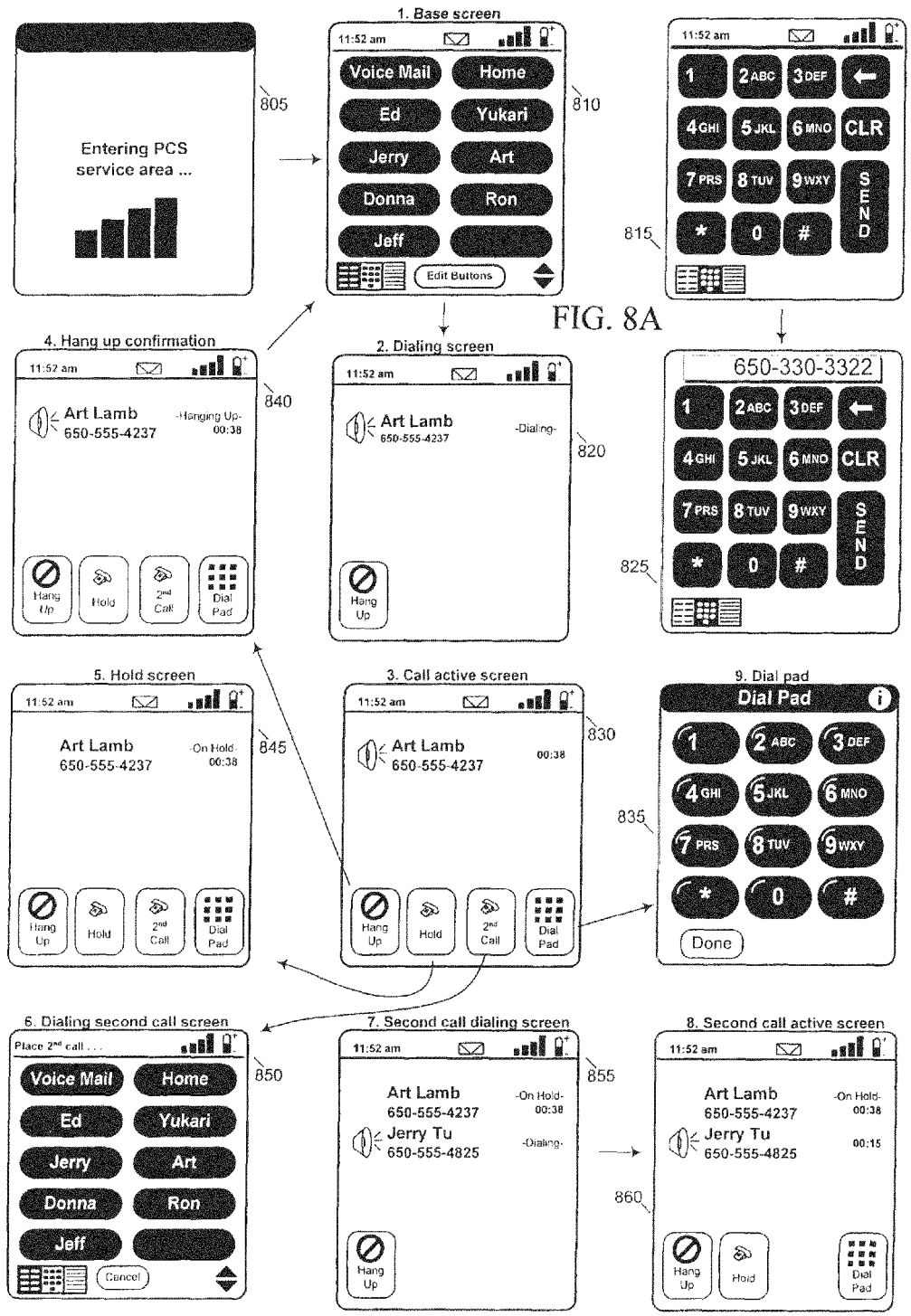
FIG. 8A illustrates one embodiment of screen shots for a dialing process for telephony operation.

FIG. 8A illustrates one embodiment of screen shots for a dialing process for telephony operation. The opening screen 805 indicates that a connection has been established with a cellular service. In one embodiment, this screen appears when the cellular element is first couples to the organizer and/or when the cellular element initially is turned on.

The base screen is the speed dialing screen 810. Programmed speed dialing screen 810 includes identifiers for each of the individuals programmed into the speed dialer. The identifiers are designated by the user, and may be nicknames, or other identifiers. In one embodiment, the top left hand slot is a voicemail slot. On the bottom left of the speed dialing screen 810 are indicated the other base screens, the dial pad screen 815, and the call history screen (not shown). An option to edit the speed dial listings is also provided. At the top of the speed dialing screen 810, and every other base screen for one embodiment, are indicators. Examples of indicator include a time indicator, a message indicator, a signal strength indicator, and a battery strength indicator. In one embodiment, there are two message indicators, indicating either a voicemail message or a text/e-mail message. In one embodiment, the message indicator may further include service provider information as well.

From the speed dialing screen 810, if a user presses a speed dial button, the screen changes to the dialing screen 820. The dialing screen 820 indicates the status of the call, as well as the identity of the person called. In one embodiment, there is a hang-up option. When the call is connected, the call active screen 830 is displayed, showing the connection time, and providing the options of hanging up, placing the call on hold, placing a second call, or engaging the key pad (to dial additional numbers, such as for a credit card call, voicemail call, dialing an extension, etc.).

If the user selects "second call", the speed dialing screen 850 appears, although the user may optionally switch to another screen. The first call is automatically placed on hold. The second call is then dialed. The-two-call dial status screen 855 indicates the status of both calls. In one embodiment, only one call can be active at any time. In another embodiment, multiple calls may be simultaneously active, and in such a case, the calls may be conferenced together.

An alternative base screen is the dialing pad 815. The dialing pad 815 displays the software generated dialing keys. When the user starts dialing, the dialing screen 825 is displayed, and the numbers dialed replace the status indicators at the top of the screen. It is noted that the screen illustrated are sample screens only. Those skilled in the art will appreciate that the location, contents, or display format of any of data presented on the screen can be altered or made optional without departing from the spirit of the disclosed embodiments.

FIG. 8B illustrates one embodiment of screen shots as the system is navigated through an incoming call alert. The incoming call alert displays a call alert screen 865. In one embodiment, if there is a caller identification enabled, the system determines the telephone number of the caller. If that telephone number appears in the call list, or on any other system that indicates the identity of the caller, the incoming screen 865 is displayed, showing the telephone number and identity of the caller. If the identity of the caller is unknown, the telephone number is displayed as shown on screen 868. And if the caller identification is not enabled, no identifier is displayed, as shown on screen 870.

The user may choose to answer the call, by pushing the answer button, or ignore the call. In one embodiment, the answer button may be a software generated button. In one embodiment, the user may also accept or ignore the call by pushing a built-in button on the cellular element. If the user ignores the call, and voicemail is enabled on the system, the call is automatically transferred to voicemail. In one embodiment, if the user ignores the call, the call may be transferred to a user designated destination. A missed call screen 883 is displayed, showing the identity, telephone number, time and date of call. The user may acknowledge the missed call, or may automatically return the call, if caller identification is enabled. In one embodiment, if the caller left a message on voicemail, a third option is displayed, permitting the user to listen to the voicemail left by the caller, shown on voicemail screen 886.

If the user answers the call, the active call screen 873 is shown. From here, the user can place the caller on hold, hang up, dial a second call, or receive a second call. When a second call is received, the first call is placed on hold, in one embodiment. In this way, the maximum amount of information is displayed to the user, regarding the status of various calls and systems.

Figure 8C:
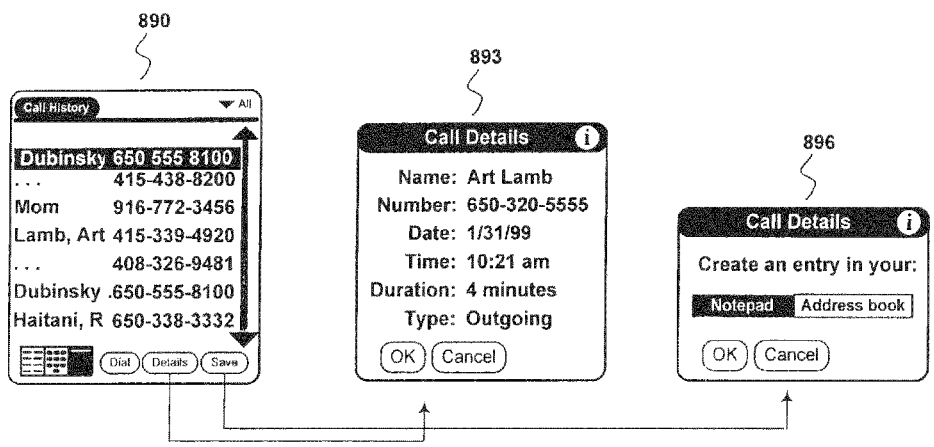
FIG. 8C illustrates one embodiment of screen shots for a call history.

FIG. 8C illustrates one embodiment of screen shots for a call history. In one embodiment, the call history screen 890 shows available information about calls made and calls received. In one embodiment, only the name and telephone number are displayed. In addition, the list is ordered by time/date of the call. In another embodiment, the list may be ordered by name. In one embodiment, the user may select details. The details screen 893 shows further available information about the call. The details screen 893 shows one or more of the following: name, number, date, time, duration of call, and type of call. In one embodiment, the user may edit the information displayed in the detail, specifically by adding/changing the name information. This would enable a user to have more complete call history information.

The user can further save information from the call history. If the user selects the "save" button, a save screen 896 is displayed. This save screen 896 permits the user to automatically add data from the history entry to his or her speed dial list and/or address book. In one embodiment, if other programs are supported, the user may further add the data into other programs, such as a contact tracker, etc. In one embodiment, the call history may interface with a contact tracking application, and automatically update information in the contact tracking application, as calls are made and received.

Figure 9A:
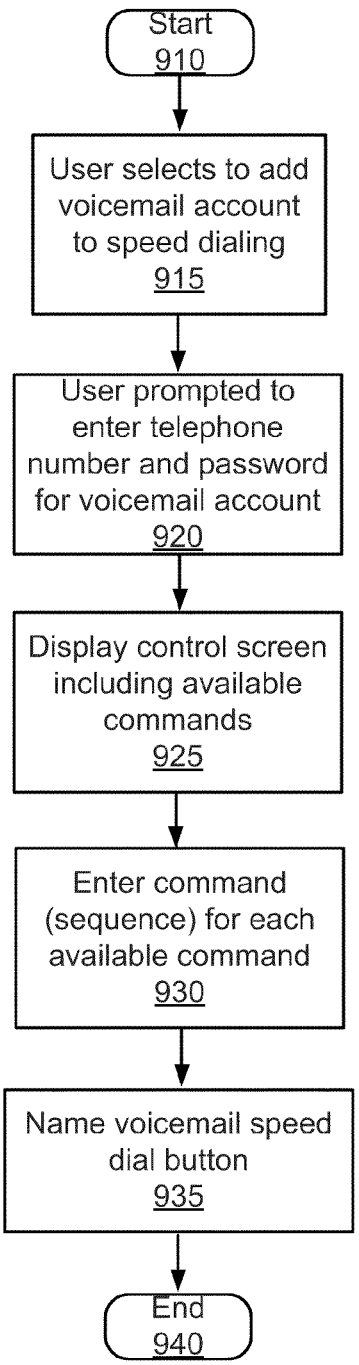
FIG. 9A illustrates a flow chart of one embodiment of a process of adding a voice mailbox to a speed dial system.

FIG. 9A is a flowchart illustrating one embodiment of adding a voice mailbox to the speed dial of the system for voicemail access. The process starts at block 910. At block 915, the user selects to add a new voicemail account to the speed dialing list. Voicemail programmed speed dial buttons are treated differently from other speed dial buttons. At block 920, the user is prompted to enter the telephone number and/or password for the voicemail account. In one embodiment, the user is permitted to use "pause" characters or "wait for tone" characters, to dial the full voicemail access code. In another embodiment, when the user first pushes the voicemail button, the telephone number is dialed, and when the user pushes the voicemail button for a second time, the password is dialed. Both of these numbers are entered at this stage.

At block 925, a control screen is displayed. The control screen includes each of the commands that are generally available in a voicemail system, such as previous message, next message, back, skip message, delete message, forward message, back to the beginning, reply to message, etc. In one embodiment, a subset of these commands may be made available. In another embodiment, the user may alter this listing, and may create new commands. At block 930, the user is prompted to enter a command or command sequence for each of the commands that are available in the voicemail system. For example, in a voicemail system, pressing the "3" key may mean "delete message."

The user can enter the number "3" underneath the command key, to program the command. In other systems, the pressing the "7" key twice may be the code to "delete message." The user can enter whatever key combination works for the specific voicemail system. At block 935, after the user finishes programming the voicemail system, the user is prompted to name the speed dial button. In one embodiment, the default name is "voicemail." However, users may have multiple voicemail accounts, and may wish to have more descriptive names. At block 940, the process ends. The programming of the voicemail access is now complete, and the user can access the voicemail system by pressing the speed dial button.

Figure 9B:
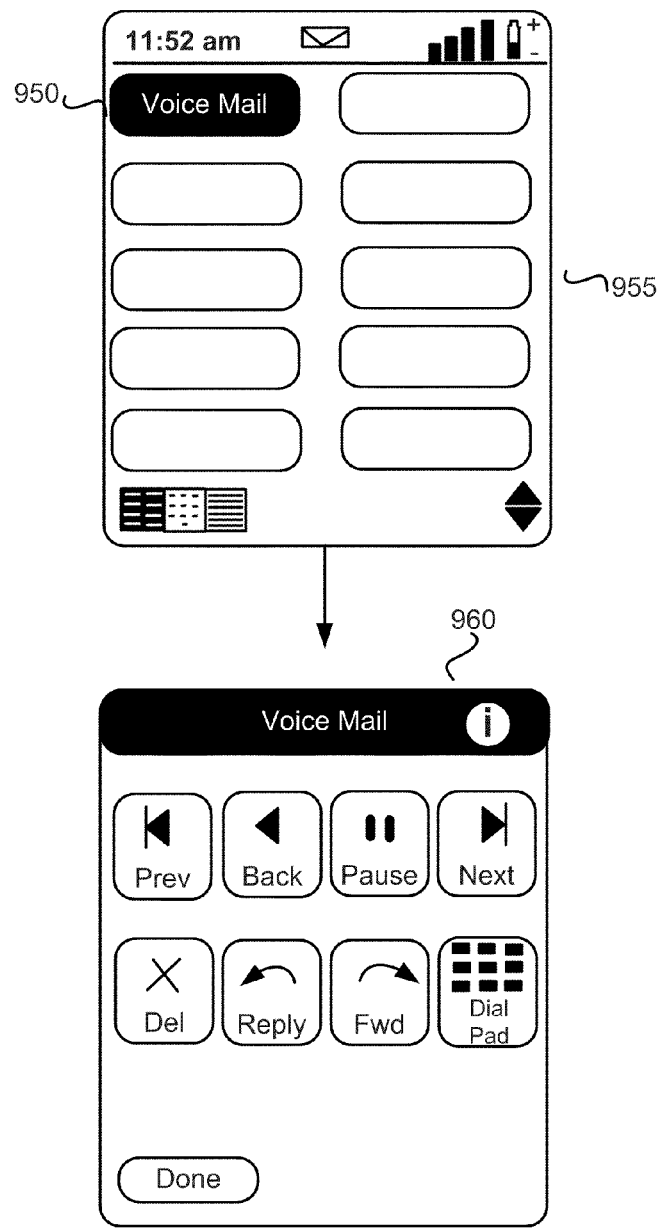
FIG. 9B illustrates one embodiment of screen shots for voicemail control.

FIG. 9B shows one embodiment of screen shots for voicemail control. The voicemail button 950 is shown on speed dialing screen 955. When the user selects the voicemail button 950, the voicemail number programmed in by the user is dialed. In one embodiment, the dialing screen is shown (see screen 820). When the call connects the voicemail control screen 960 is displayed. The voicemail control screen 960 includes the controls available for the voicemail system. Control screen 960 is an exemplary screen, showing the controls: prev(ious message), back (to the beginning of the message), pause, next (message), del(ete message), reply (to message), forward (message), and dial pad, for entering additional commands. Other layouts or sets of commands may be used. However, using this type of voicemail control screen 960 for all voicemail applications simplifies access to multiple voicemail accounts.

Additional Embodiments of a Telephone User Interface

The embodiments disclosed allow for enhanced telephony functionality over conventional telephony systems. An embodiment of such enhanced offerings is a method and an apparatus for accessing contacts database and telephone services. For example, cellular telephone users often are dependent upon "speed dial" features in their cellular telephones. A typical cellular telephone has a non-volatile memory for storing the names and associated telephone numbers for a plurality of the user's acquaintances. The telephone speed dial user interface then allows the user to place a telephone call to one of the stored telephone numbers relatively quickly and easily.

Existing mobile telephone speed dial systems can operate in a variety of ways. One such speed dial system allows the user to associate a telephone number with a unique one or two digit code. The user can then dial the number by entering the one or two digit code followed by the "SEND" key to place the speed dial call. Other systems allow a single digit speed dial number to be dialed by pressing and holding the associated digit key. In order for this system to be effective, the user must memorize the codes associated with the telephone numbers.

Another existing speed dial system allows the user to utilize letters associated with keys on the telephone keypad to spell out the name of the person associated with a stored telephone number. This can be a tedious process since typically three or four letters are assigned to each button on the telephone keypad, which necessitates several key presses for each of the letters in the name spelt. Once names have been entered, the names may be displayed on the telephone screen. The user may then use an input device (up/down keys or toggle switch) to scroll up and down the list to select a desired name and thereby dial the associated telephone number. With a long list of names, it becomes very cumbersome to scroll through the list.

With the advent of more sophisticated combined handheld computer and cellular telephone systems, the telephone dialing aids can become much better. The present invention introduces telephone directory methods for quickly and intuitively allowing the user of a combined handheld computer and cellular telephone system to locate and dial the telephone number of a desired. Specifically, the present invention provides a telephone application having a user interface that gives a user multiple different views of information that allow a user to make telephone calls in a simple intuitive manner.

Figure 10:
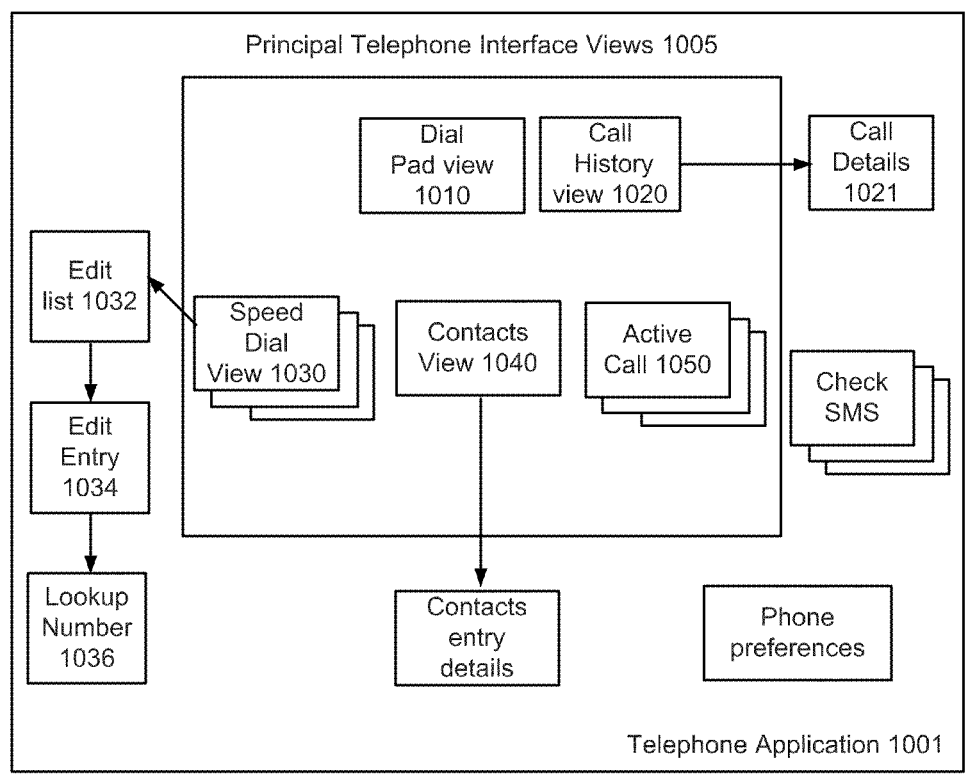
FIG. 10 illustrates a functional block diagram of a telephone user interface software application.

The telephone user interface of the present invention comprises four permanently available views and a fifth view that is available when there is an active incoming or outgoing telephone call. The five different views consist of: a speed dial view, a dial pad view, a contacts view, a call history view, and an active call view. FIG. 10 illustrates a conceptual diagram of the telephone application 1001. As illustrated in FIG. 10, the telephone application 1001 consists of a set of principal telephone interface views 1005 that include the dial pad view 1010, call history view 1020, speed dial view 1030, contacts view 1040, and active call view 1050.

In a preferred embodiment, certain events will cause the telephone application to automatically switch between different views. For example, when an incoming telephone call is detected, the telephone application will automatically switch to the active call user interface view in order to show the user information about the incoming telephone call.

Another event that may cause the telephone application to automatically switch between different views is the entry of characters from an input device such as a keyboard or digitizer pad (which can be interacted with a stylus, finger, inductive pen or other mechanism to select and input through the digitizer pad). In one embodiment, the entry of an alphabetic character will cause the telephone application to move to the contacts user interface view that is used to search a database of personal contact information. The contact user interface view will then begin to filter through the contact database using the entered character(s) as a search string. Similarly, the entry of a digit may cause the telephone application to automatically switch to the dial pad user interface view. Additional information on the various automatic user interface view switches can be found in the sections on each different interface view.

On Screen Dial Pad User Interface

Figure 11A:
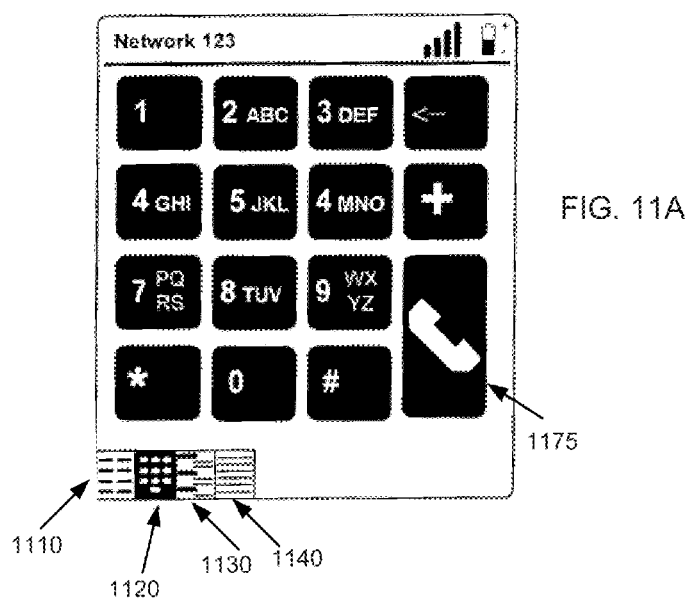
FIG. 11A illustrates one embodiment for a display arrangement for a telephone dial pad user interface view.

The dial pad user interface view 1010 provides a conventional dual tone multiple frequency (DTMF) touch tone dial pad interface to users such that users may make outgoing telephone calls with a familiar interface. FIG. 11A illustrates one embodiment of the dial pad view. Although the dial pad user interface view is probably the most familiar telephone application view to new users, the dial pad user interface view is probably the least efficient of the various different telephone application user interface views. In one embodiment, the dial pad user interface view is set up as the initial user interface view for the telephone application in the handheld computer and cellular telephone system since most users will be very familiar with the dial pad user interface view. However, the user may later select another view for more efficient telephone number dialing.

When a user is in the dial pad user interface view, a user can touch the touch-tone buttons presented on the screen as illustrated in FIG. 11A to dial a telephone number. Pressing the telephone icon will send the entered digits to the cellular telephone network to initiate a telephone call. The dial pad view of FIG. 11A may be invoked even when there is an active telephone call. In this manner, the dial pad view may be used to enter DTMF touch-tones in order to access interactive telephone response system such as a voicemail system or a telephone banking system.

In one embodiment, when a user begins entering a telephone number, the telephone number being dialed is placed in the title bar 1190. The user may also access the last ten dialed telephone numbers by scrolling up or down. Specifically, hitting the scroll up or down key will move through the last ten numbers dialed and individually display each number in the title bar area 1190.

In the lower left corner of the dial pad view illustrated in FIG. 11A, the user interface includes four buttons for accessing the four permanently available user interface views. Specifically, the buttons include a speed dial view button 1110, a dial pad view button 1120, a contacts view button 1130, and a call history view button 1140. Note that the dial pad view button 1120 is shown highlighted by inverted graphic colors since the dial pad view is the current active view. To select any of the other telephone application user interface views, the user merely selects the associated view button 1110, 1130, or

1140. The user may also repeatedly press an application button associated with the telephone application to rotate through the various telephone application user interface views (including the active call view if there is an active call.).

Figure 11B:
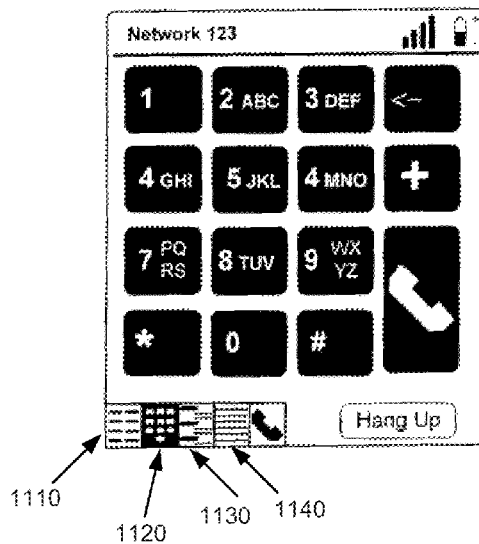
FIG. 11B illustrates the telephone dial pad user interface view of FIG. 10A when there is an active telephone call.

As previously set forth, a fifth user interface view is available when there is an active telephone call. FIG. 11B illustrates a fifth user interface view button known as the active call view button 1150 used to access an active call user interface view (that will be described later). Active call view button 1150 is only available when there is an active telephone call.

If the handheld computer and cellular telephone embodiment includes a keyboard 330 as illustrated in FIG. 3A, then the user may dial a telephone number using the keyboard 330. If the keyboard contains keys that may be interpreted as a letter or a digit, as is the case with the dial pad area 391 of the keyboard illustrated in FIG. 3C, then the keystrokes entered from the keys in the dial pad area 391 of the keyboard will be interpreted as numbers when in the dial pad view in the preferred embodiment. Letter keystrokes will be ignored.

In an alternate embodiment, the dial pad user interface view is used to provide the user with an easy means of entering telephone numbers that use letter mnemonics. For example, 1-800-FLOWERS is a floral service that uses the letter mnemonic 1-800-FLOWERS in order to have potential customers easily remember the contact telephone number. However, dialing a telephone numbers with letter mnemonics can be quite difficult since the user must search the telephone dial pad in order to locate the DTMF key with the desired letter. In order to allow the user to quickly enter such telephone numbers, one embodiment allows the user to enter the letters directly and the computer will translate the letters into the proper associated DTMF tones. For example, if the text for "FLOWERS" were entered, the DTMF tones associated with dial pad numbers "3549377" would be generated. (See the alphabet to DTMF key mapping illustrated in FIGS. 11A and 11B.).

Certain aliasing may occur in such an alternate embodiment. However, an intelligent program could use certain heuristics to determine the desire number in most circumstances. For example, if the user were to dial the full number "1800FLOWERS" without using the option key 301 to specify the "1800" portion as numbers, the system would not know if the first four digits should be numbers ("1800") or letters that should be translated into associated DTMF tones ("YN00" equivalent to dial pad numbers "9400").

However, a heuristic could be used to always translate the "YN00" patter into the common 1800 prefix for eleven digit numbers. The "FLOWERS" portion would easily be recognized as a letter mnemonic in an embodiment that uses the keyboard of FIG. 3C since none of the letters in "FLOWERS" is on the same key as a number. However, the letter mnemonic of "LAWYERS" is ambiguous since the letter "Y" and the number "1" are on the same key on the keyboard of FIG. 3C. In such circumstances, the system could use the heuristic that "All ambiguous letter/number keystrokes located between two certainly letter keystrokes should be interpreted as letters". Thus, since the "L" at the beginning of "LAWYERS" and the "S" at the end of "LAWYERS" can only be interpreted as letters, then all the keystrokes between those two letters ("AWYER") should be interpreted as letters.

Call History View

Referring back to FIG. 10, another one of the permanently available user interface views is the call history view 1120. The call history view 1120 provides a list of previous incoming, outgoing, or missed calls such that a user may use that information to make a new outgoing call.

Figure 12:
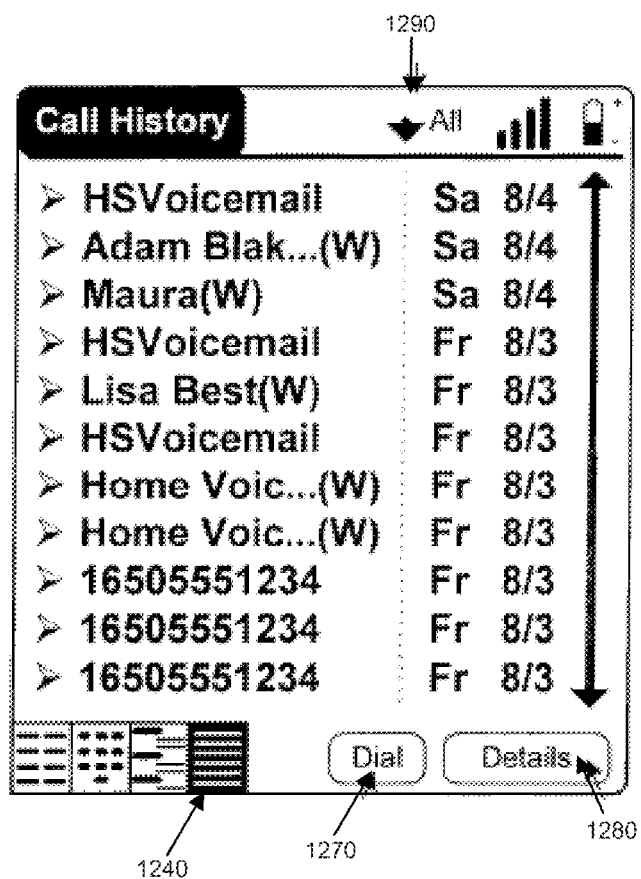
FIG. 12 illustrates one embodiment for a display arrangement for a telephone call history user interface view.

FIG. 12 illustrates one embodiment of the call history user interface view. As illustrated in FIG. 12, the call history provides a history of all the incoming, outgoing, and missed calls. Note that the call history view button 1240 is now highlighted with inverted graphics. The user may filter the call history list may by changing the category selection 1290 to select only the incoming calls, only the outgoing calls, or only the missed calls. (The "All" selection illustrated in FIG. 12 illustrates all incoming calls, outgoing calls, and missed calls.

To dial a particular number from the call history list, the user may select the call and then activate the dial button 1270. Alternatively, the user may simply press the space bar or return key on the keyboard illustrated in FIGS. 3A and 3C. To obtain more information on a particular call in the call history list, the user may select a particular call from the call history list and then activate the details button 1280.

If a user is in the call history view and begins entering alphabetic characters, the telephone application will automatically switch to the contacts view. Once in the contacts view, the telephone application will begin searching for a desired contact using the entered character(s) as a search string as will be set forth in the section on the contacts user interface view.

Speed Dial View

Referring back to FIG. 10, another one of the permanently available user interface views is the speed dial view 1030. The speed dial view 1030 provides a list of commonly called telephone numbers for quick access. Due to its simple and intuitive design, the speed dial user interface view is probably the most useful user interface view of the telephone application after the user has customized the speed dial user interface view by entering several telephone numbers into it. Thus, the user will be encourage to make the speed dial view the initial default view after some speed dial entries have been created.

Figure 13:
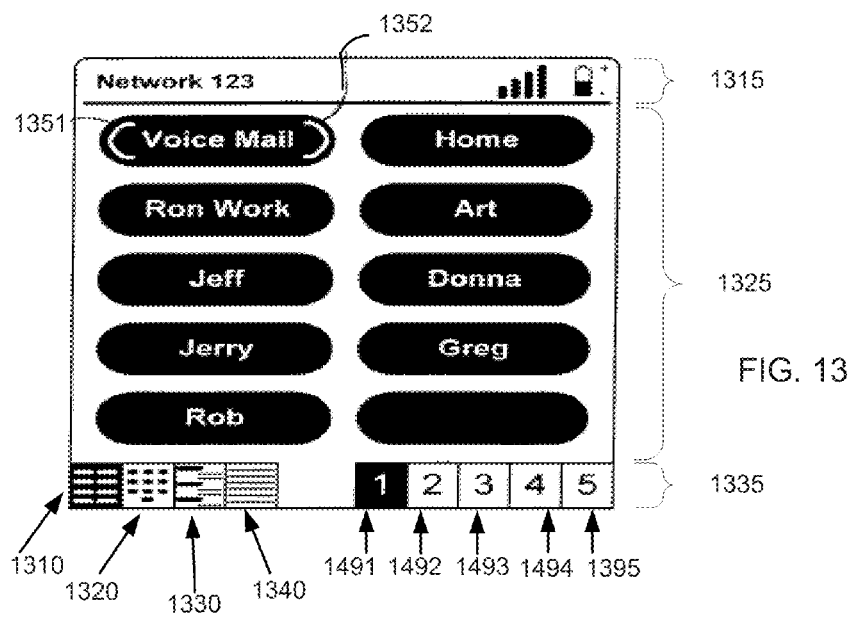
FIG. 13 illustrates one embodiment for a display arrangement for a telephone speed dial user interface view.

FIG. 13 illustrates one embodiment of the speed dial user interface view. In this example view, note that the speed dial view button 1310 is now highlighted with inverted graphics since it is the current active view. The speed dial user interface view has a title bar 1315 at the top of the screen and a command button area 1335 at the bottom of the screen. The area 1325 between the title bar 1315 and command button area 1335 on the speed dial user interface view is occupied by ten programmable speed dial buttons, arranged in two columns of five buttons per column. Each of the speed dial buttons corresponds to a speed dial record. The speed dial record tag or label (or a portion thereof) is displayed on the screen button, and activating ("tapping") a button with a label causes the telephone application to control the handheld computer and telephone peripheral to dial the telephone number of the corresponding speed dial record. A user may customize all of the different speed dial buttons with their own personal speed dial numbers.

The speed dial user interface view of the present embodiment implements a page metaphor, whereby a plurality of speed dial "pages" are each used to store a sub-set of speed dial records. In the embodiment of FIG. 13, there are five different speed dial pages. To navigate between the different speed dial pages, there are a set of five numbered speed dial page buttons 1391, 1392, 1393, 1394, and 1395 in the lower left corner of the speed dial user interface view. The currently displayed speed dial view page is the first speed dial page such that first speed dial page button 1391 is highlighted with inverted graphics. Tapping on any of the other page buttons 1392, 1393, 1394, or 1395 will effect display of the contents of that page (and that page button will then become highlighted).

The user may navigate though the various speed dial entries using a scroll button. In FIG. 13, the voicemail speed dial button is highlighted with a pair of white brackets 1351, 1352. Pressing a scroll down button would move the highlighting to the next non empty speed dial entry ("Ron Work" in this example). In one embodiment, pressing the up scroll button when the first speed dial entry is highlighted will move to a non empty speed dial button on the next non empty page of speed dial buttons (page 2 in this example assuming page 2 has a non empty speed dial button). In an alternate embodiment, pressing the pressing the up scroll button when the first speed dial entry is highlighted will move to a non empty speed dial button on the next non empty page of speed dial buttons (page 5 in this example assuming page 5 has a non empty speed dial button).

When the last non empty speed dial button of a speed dial page is highlighted ("Greg" in this example), pressing the scroll down button will move the highlight to the first non empty speed dial button of the next non empty speed dial page (page 2 in this example assuming page 2 has a non empty speed dial button.). In an alternate embodiment, pressing the scroll down button when the last non empty speed dial button of a speed dial page is highlighted ("Greg" in this example) will move the highlight to the first non empty speed dial button of the same speed dial page ("Voice Mail" in this example).

Figure 15A:
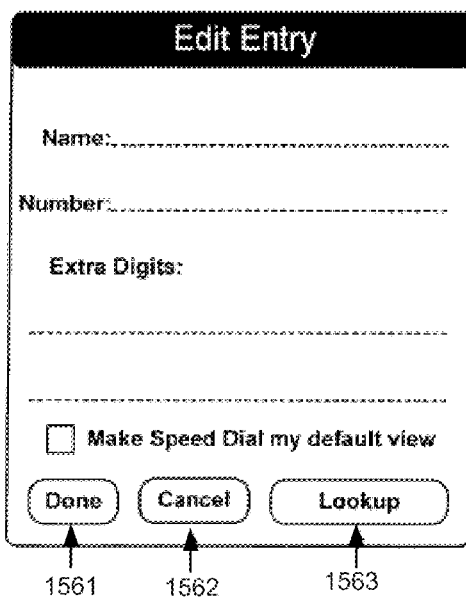
FIG. 15A illustrates one embodiment for a display arrangement for a telephone speed dial record creating user interface.

The basic operation of the telephone application from the speed dial user interface view in ordinary operation is as follows. Each of the five speed dial view pages has ten speed dial soft buttons that are user assignable. When a speed dial button has been assigned to a speed dial record by the user, that speed dial button displays the tag or label of the speed dial record. Tapping on (activating) a speed dial button causes the automatic dialing of the corresponding assigned telephone number. Tapping on a speed dial button with no number assigned (e.g. an empty button) effects display of an edit speed dial page as illustrated in FIG. 15A that allows the user to generate a speed dial record to be assigned to that button.

Figure 14:
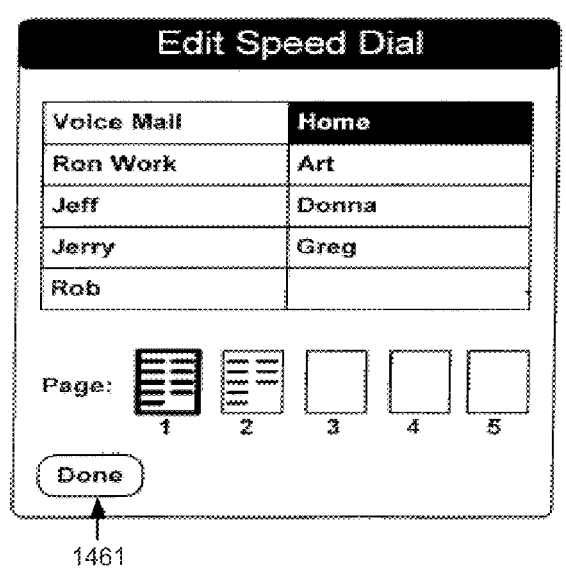
FIG. 14 illustrates one embodiment for a display arrangement for a telephone speed dial page editing user interface.

Tapping (e.g., or otherwise selecting) on the title bar 1315 of the speed dial user interface view reveals a pull down edit menu (not shown). Selecting the edit menu causes an edit speed dial page (1032 in FIG. 10) to be displayed. Referring back to FIG. 10, from the speed dial view 1030 the speed dial data can be entered and amended by the user through edit list 1032, edit entry 1034 and find number functions 1036 which are described in detail hereinbelow. The layout of the edit speed dial page is illustrated in FIG. 14. The edit speed dial page provides the primary basis by which the user can arrange speed dial settings on the Speed Dial pages, edit speed dial records (1034 in FIG. 10) and find telephone numbers for assignment to the speed dial buttons (1036 in FIG. 10).

The Edit Speed Dial page of FIG. 14 contains a table of ten "slots" arranged in two columns of five, with each slot corresponding to a speed dial button 1125 on the speed dial user interface view. There are notionally five edit speed dial pages, one for each of the speed dial view pages. The slots in the table contain the text of the tags or labels for the speed dial records assigned to the corresponding buttons. When in the edit speed dial page view, one of the slots is always "selected", and the user can change the selected slot by tapping on the corresponding position of the table. In FIG. 14 the selected slot is indicated by inverted graphic colors.

Located below the table of speed dial buttons for a page is a set of speed dial page button icons 1435 that operate in a similar manner to the speed dial page buttons 1391, 1392, 1393, 1394, and 1395 and allow the user to navigate amongst the five edit speed dial pages. The speed dial page button icons 1435, however, are larger than the speed dial page buttons 1391, 1392, 1393, 1394, and 1395 because they also display an indication of the speed dial button assignments on each of the speed dial pages. This is achieved by small horizontal lines arranged in the speed dial page button icons 1435 representing speed dial buttons on that page that have assigned speed dial records in the specified locations.

By way of example, as seen in FIG. 14, the speed dial page icon has ten horizontal lines indicated that the first speed dial page has all slots occupied and thus all corresponding speed dial buttons assigned. The second speed dial page icon indicates that that page has two "empty" slots/buttons at the lower right positions. Speed dial pages three, four, and five are all shown as empty in FIG. 14. This icon display allows the user to quickly and easily determine which pages have empty slots/buttons at a glance from the edit speed dial page view, which is particularly useful for editing and rearranging speed dial assignments as described in greater detail herein below.

The edit speed dial page may also contain several command buttons at the bottom of the screen for performing specific functions. In the embodiment of FIG. 14 only a "Done" 1461 command button is illustrated. Tapping on the "Done" command button 1461 returns the user to the speed dial user interface view. Other command buttons may be implemented to enable other operations to be performed on the speed dial record of the selected slot.

Tapping on an empty speed dial slot from the edit speed dial page causes the display of a new speed dial edit entry page as illustrated FIG. 15A. The new speed dial edit entry page displays the data of the speed dial record for the selected slot speed dial slot. In particular, the edit entry page has a "Name" field at for displaying and editing the speed dial record tag or label, and a "Number" field at for displaying and editing the telephone number for the speed dial record.

The edit entry page also has a field labeled "Extra Digits" that provides the user the ability to specify a string of DTMF touch tones that may be sent by the user after initiating a telephone call using the telephone number associated with the speed dial record. For example, for a particular telephone number corresponding to a voicemail system, the user may specify a string of DTMF touch tones in the "Extra Digits" field for accessing the user's voicemail box. In another application of the "Extra Digits" field, the "Number" may contain a long distance service access telephone number and the "Extra Digits" field may specify a particular long distance account code.

The entry fields "Name", "Number", and "Extra Digits" in the edit entry page are each editable by the user in conventional manner on the handheld computer system, e.g., 300. For example, the fields can be edited using the stylus on the touch sensitive screen or using a keyboard. When editing the "Number" or "Extra Digits" fields, the computer system may be put into a special "number lock" mode that only allows numbers or other touch tone characters such as "*" and "#" to be entered. The edit entry page has several command buttons labeled "Done" 1561, "Cancel" 1562, and "Lookup" 1563. Tapping on the "Done" button 1561 causes the telephone application to return to the edit speed dial page of FIG. 14, retaining any changes to the speed dial record made by the user. The "Cancel" button 1562 effects return to the edit speed dial page of FIG. 14 but discarding any speed dial record changes. The "Lookup" button 1563 allows the user to find a telephone number from the user's telephone book (to be described in the next section) to insert in the "Number" field.

Figure 15B:
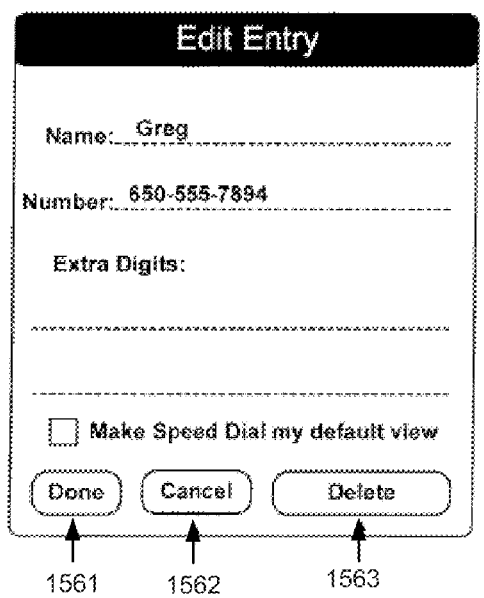
FIG. 15B illustrates one embodiment for a display arrangement for a telephone speed dial record editing user interface.

Referring to FIG. 14, tapping on a filled speed dial slot from the edit speed dial page causes the display of a existing speed dial edit entry page as illustrated FIG. 15B. The difference between the new speed dial edit entry page of FIG. 15A and the existing speed dial edit entry page of FIG. 15B is that the existing speed dial edit entry page replaces the "Lookup" button with a "Delete" button that allows the user to delete the speed dial record.

One special speed dial record is a voicemail speed dial record associated with the voicemail-box of the cellular telephone itself. To prevent loss of this special speed dial record, the voicemail record associated with the voicemail-box of the cellular telephone should not be deleteable. However, the voicemail record is moveable such that the user can place the voicemail record into any available speed dial slot.

When a user is in the speed dial user interface view and begins entering alphabetic characters, the telephone application will automatically switch to the contacts view of the telephone application. Once in the contacts view, the telephone application will begin searching for a desired contact using the entered character(s) as a search string as will be set forth in the following section describing the contacts user interface view.

Figures 16, 17:
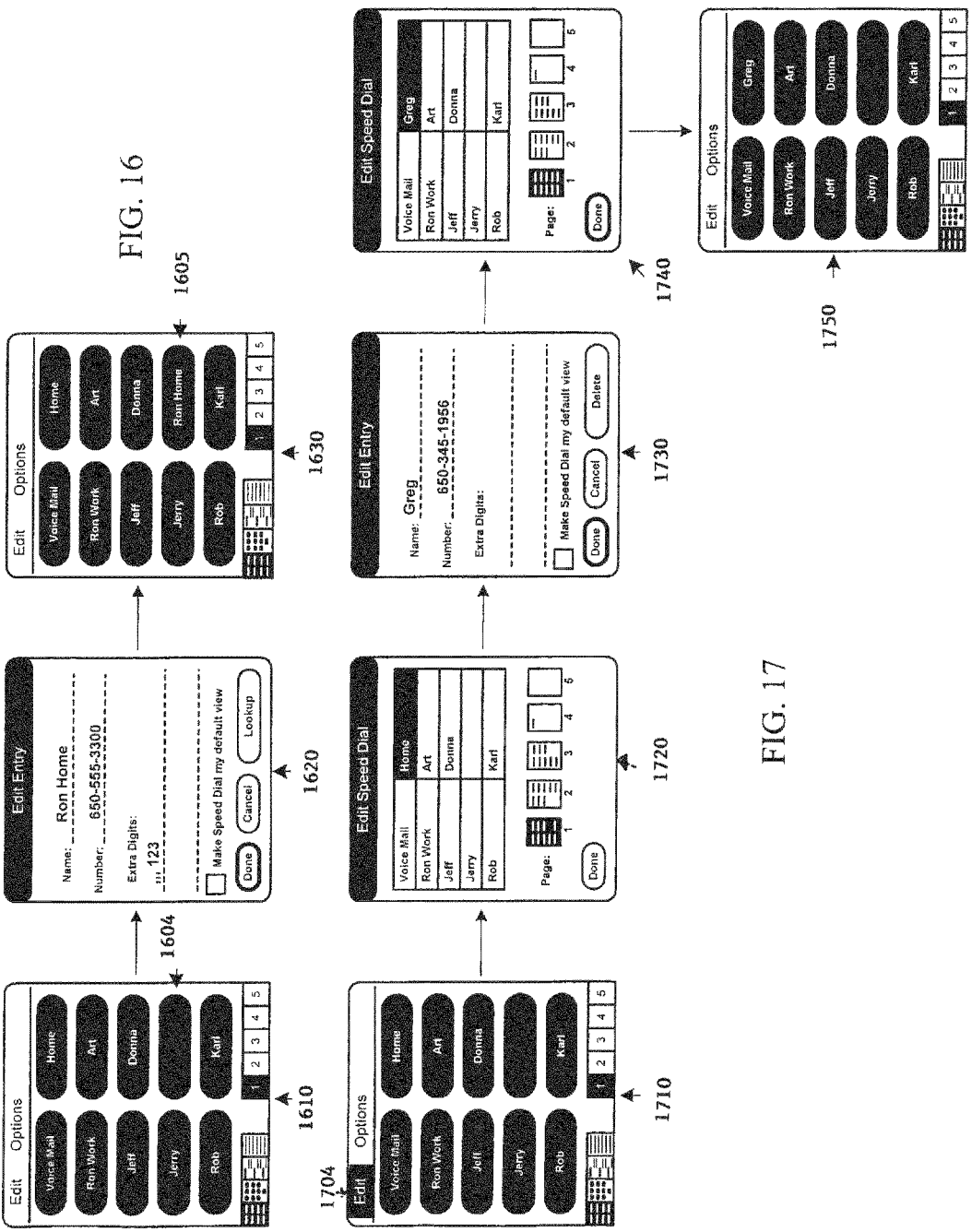
FIG. 16 illustrates one embodiment of a series of user interface screens navigated by a user when creating a new speed dial entry in an empty speed dial slot.
FIG. 17 illustrates one embodiment of a series of user interface screens navigated by a user when creating a new speed dial entry in a speed dial slot that already has a current speed dial record.
Figure 18:
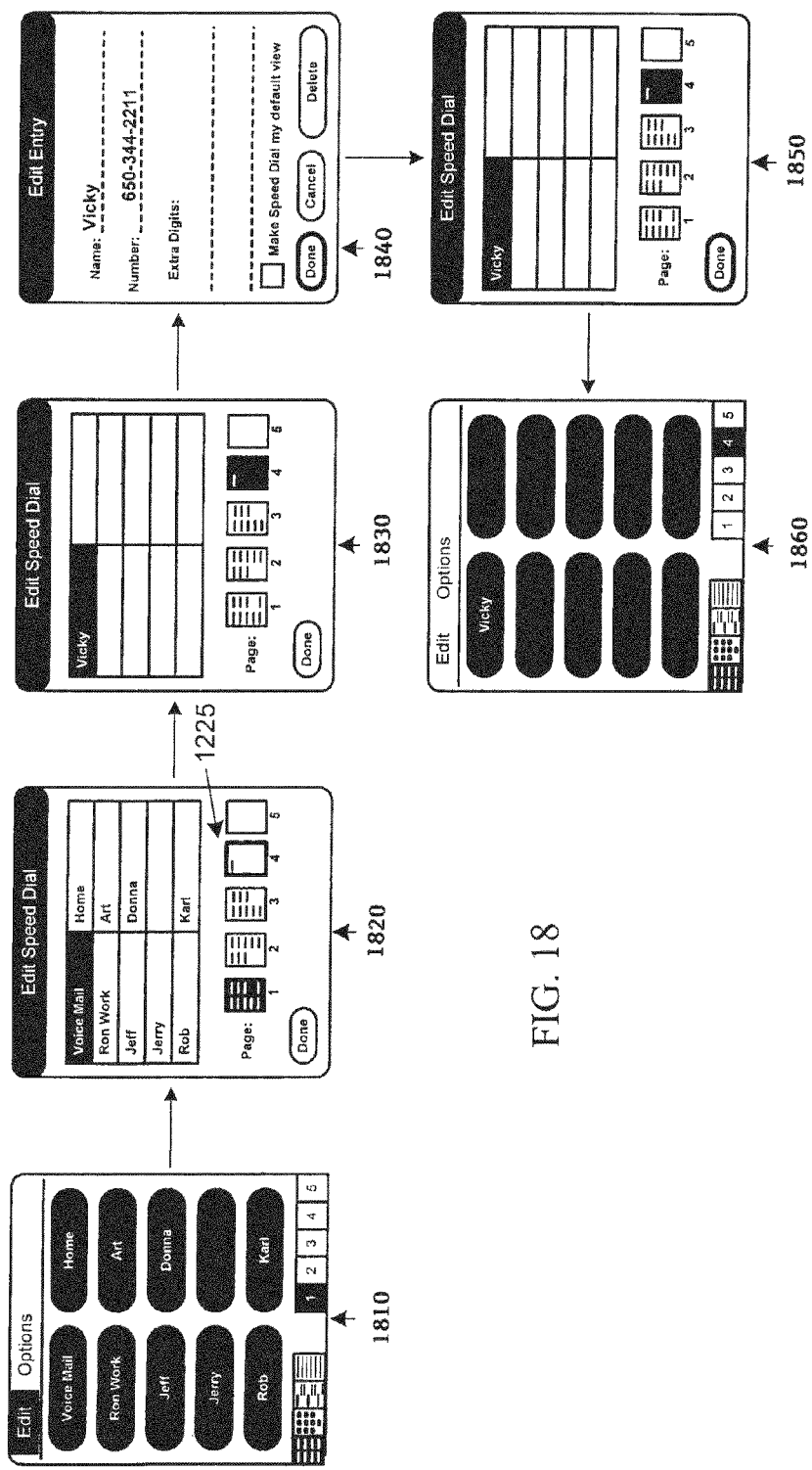
FIG. 18 illustrates one embodiment of a series of user interface screens navigated by a user when editing an existing speed dial entry from a different speed dial page.

FIGS. 16, 17, and 18 illustrate how the speed dial user interface view and its associated editing views can be used to create and edit speed dial records. The editing procedures are described with reference to the previously described speed dial editing screens. FIG. 16 illustrates the creation of new speed dial button beginning from an empty button from a speed dial user interface view 1610. The user taps on an empty button 1604 that opens the edit entry page 1620 used to create new speed dial records or edit existing speed dial records. In the edit entry page 1620, the user enters data into the "Name", "Number" and optionally "Extra Digits" fields using conventional data entry means to create a new speed dial record. Tapping on the "Done" button effects return to the Speed Dial page 1630 with the previously empty button now assigned to the new speed dial record. The button 1605 now displays the Name field text, in this case "Ron Home" indicating that the speed dial button/slot is no longer empty.

A speed dial button insertion procedure is illustrated at in FIG. 17, beginning from a speed dial user interface page 1710. The user taps on the title bar of the Speed dial page and selects the revealed "Edit" menu item 1704. This cause the telephone application to bring up the edit speed dial page 1720 corresponding to the speed dial user interface page 1710. The user selects one of the slots on the edit speed dial page 1720 to edit and taps it. The telephone application then displays the edit entry page 1730, allowing the user to edit the speed dial record as previously described. The user taps on the "Done" button at the completion of the speed dial record editing to return to the edit speed dial page as shown at 1740. The selected slot now contains the edited speed dial record. Tapping on the "Done" button effects return to the corresponding speed dial page 1750, where the new speed dial record tag or label is displayed on the speed dial button.

A second speed dial record editing procedure is illustrated with reference to FIG. 18, beginning from a speed dial user interface view 1810. The user obtains the corresponding edit speed dial page 1820 through selection of the "Edit" pull-down menu item. In this case the user selects a different speed dial page to edit by tapping on the associated speed dial page icon 1825. An occupied speed dial slot on speed dial edit page 1830 is selected by tapping on it to transition to the edit entry page 1840 containing the speed dial record data for the selected speed dial slot. The user is then able to edit the speed dial record data as desired.

After completing the desired edits, the user taps the "Done" button to store the amended speed dial record. The telephone application then returns to the edit speed dial page 1850 for the fourth speed dial page. Finally, tapping on the "Done" button on edit speed dial page 1850 returns the user to the speed dial user interface view 1860 of the edited speed dial page, the fourth speed dial page in this example.

Contacts View

Referring back to FIG. 10, the final permanently available user interface view is the contacts view 1040. The contacts user interface view provides the user access to a large database of contact information. Each contact record in the contacts database may contain the name, work address, home address, work telephone number, home telephone number, mobile telephone number, fax number, Internet email address, and other personal contact information.

Figure 19:
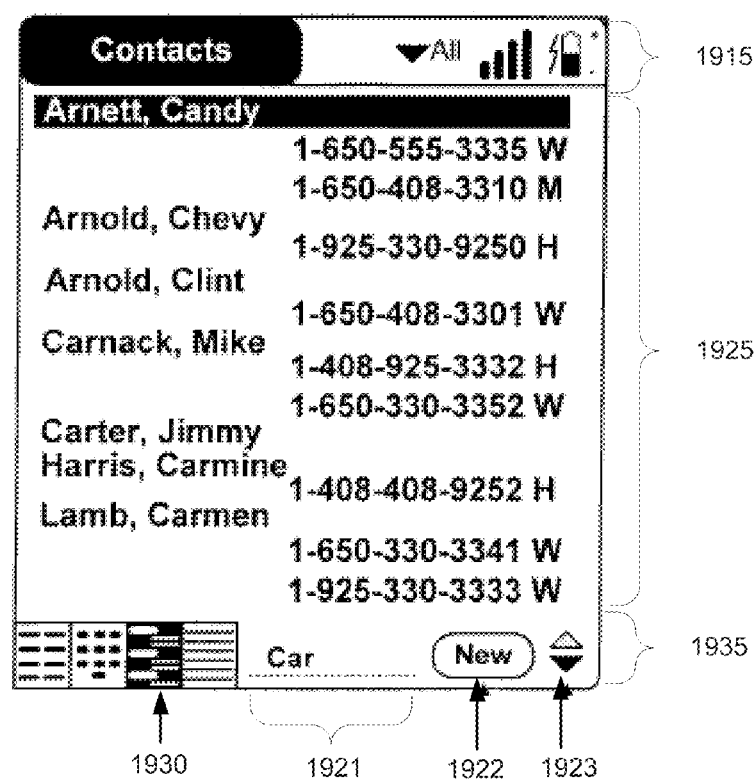
FIG. 19 illustrates one embodiment for a display arrangement for a telephone contacts user interface view.

FIG. 19 illustrates one embodiment of the contacts user interface view. Note that the contacts view button 1930 is now highlighted with inverted graphics. The contacts user interface view is comprised of a title bar 1915, a main area 1925, and command area 1395. As illustrated in FIG. 19, the main area 1925 of the contacts view comprises an integrated list of names and associated telephone numbers. The names may be listed as "last-name, first-name" or "first-name last-name" as selected by the user. Furthermore, the names will be displayed in alphabetical order using "last-name, first-name" or "first-name, last-name" as selected by the user. In the illustration of FIG. 19, the names are listed in the "last-name, first-name" display format and order. The names displayed in the main area 1925 are left justified.

The telephone numbers associated with the displayed names are displayed below the associated name and right justified. Note that by using a full line for the name and a full line for each associated telephone number, the display will not need to abbreviate or shorten most names or telephone numbers. In a preferred embodiment, only the voice telephony telephone numbers such as a home telephone number, a work telephone number, a main telephone number, a mobile telephone number and/or other voice telephone number associated with each name is displayed. Fax numbers are not displayed since it is generally not useful to dial a fax number from the computer-based mobile telephone system. The telephone numbers are listed in the same order as the telephone numbers exist in the contact record.

In the command area 1935 of the contacts user interface view resides a pair of scroll buttons 1923, a "new" button 1922, and a search field 1921. The new button 1922 allows the user to enter a new personal contact record. The scroll buttons allow the user to scroll up and down through the list of names and telephone numbers illustrated in the main area 1925 of the contacts user interface view. The search field 1921 allows the user to search for a particular name in the database of personal contact information. In one embodiment, a search mechanism can be used further to help manage contact in the contacts database. The search system may be simple and intuitive to allow for each of use. In one embodiment, the search field uses a multiple filter system to search the database of personal contact information.

The search field 1921 allows a user to enter characters from a desired name. Characters may be entered in different manners as dependent upon the particular handheld system. For example, the characters may be entered using a keyboard 330 or entered into a text area 125 using a stylus in association with character recognition software. After each character entry, the filter system produces a filtered subset of names and associated telephone numbers from the entire contacts database. At least a portion of that filtered subset is then displayed in the main area 1925. If an alphabetic character is entered while the user is in any of the other permanent user interface screens, the telephone application will immediately open the contacts user interface view and begin a search of the contacts database.

In a preferred embodiment, the system creates a subset that contains all names having a first name that matches the entered letters (for example "GR" would match the name Greg Shirai), a last name that matches the entered letters (for example "GR" would match the name Bob Green), or a first name initial and last name that matches the entered letters (for example "GR" would match the name George Robinson).

Spaces within names are ignored for matching purposes in order to use the space bar on a keyboard as the signal to dial the number. Thus, "vand" matches the last name of name Jean-Claude Van Damme. When a user deletes a character, the search will add back names that now match the shorter string. Additional details on a preferred filtering embodiment can be found in the co-pending patent application entitled "Multi-Context Iterative Directory Filter", filed concurrently with this application and hereby incorporated by reference.

Referring to FIG. 19, the user has entered the characters "CAR" in the search field 1921. The search letters "CAR" match the names "Harris, Carmine" and "Lamb, Carmen" since the letters "CAR" are in the first names of those two names. The search letters "CAR" match the names "Carter, Jimmy" and "Carnack, Mike" since the letters "CAR" are in the last names of those two names. Finally, the search letters "CAR" match the names "Arnett, Candy", "Arnold, Chevy", and "Arnold, Clint" since the letters "CAR" match the initial of the first name and the first two letters of the last name of those three names. This final filtering criteria, the matching of a first name initial and last name is one of the most powerful features of the search system because there is not a large amount of aliasing in this filter. This final filtering criteria is particular useful when searching for the contact information for a particular family member since the common last name of family members will cause undesirable aliasing.

In the example of FIG. 19, if the user has family members "Arnett, Candy", "Arnett, Kevin", "Arnett, Paul" and "Arnett, Susan", only the name "Arnett, Candy" is displayed since it is the only family name that matches the "CAR" string. At any time during a search, the user may use scroll through the currently displayed search results by using scroll buttons 1923, scroll keys on a keyboard, or other scrolling input means.

As previously set forth, the telephone application may automatically open the contacts user interface view if the user begins entering characters while in the speed dial or call history view. In an embodiment that uses a keyboard containing keys that are associated with both a letter and a digit, such as the Y/1 key on keyboard of FIG. 3C, it may be considered ambiguous as to whether the user is attempting to dial a number or spell out a name.

For example, the series of keystrokes N/8, Y/1, K/6, K/6, and I/3 may be the name "Nikki" or the number "81663". The telephone application will assume that a name is being spelled out and search through the contacts database using some filtering means. However, if there is no matching contact and all the entered keystrokes were from keys that have both a letter and a digit, then the telephone application will assume the user is attempting to dial a telephone number with the key pad area 391 and automatically switch to the dial pad view and display the entered keystroke sequence as a series of digits. Thus, it is possible to be in the speed dial user interface view, begin entering keystrokes, automatically switch to the contacts view, and then automatically switch to the dial pad view, if the series of keystrokes were all from the dial pad area 391 and associate letters do not match an entry in the contacts database.

Referring back to FIG. 19, in the main area 1925 of the contacts user interface view, either a name (from the left-justified names) or a telephone number (from the right justified associated telephone numbers) may be highlighted for focus. Normally, the first telephone number in the main area 1925 is initially highlighted for focus. In FIG. 19, the name "Arnett, Candy" is highlighted with inverted graphics after a user has scrolled upward. When a highlighted name is activated by pressing an enter key, a keyboard space bar, or other means, the system opens up a full contact editing screen for editing a contact record associated with the selected name. When a highlighted telephone number is activated by pressing an enter key, a keyboard space bar, or other means, then that highlighted telephone number is automatically dialed by the cellular telephone system.

In a preferred embodiment, the telephone numbers are not displayed exactly as the telephone numbers are entered into the contact record. Instead, the telephone numbers are displayed exactly how the cellular telephone will dial the number. Thus, any rules for adding or removing area codes or other prefixes or postfixes should be applied before displaying the number. Similarly, any extraneous text such as "ext. 123" should be removed.

In an alternate embodiment, the email address (if available) associated with a displayed name is also displayed. The email address may be display on its own line just as the voice telephony telephone numbers are displayed. In this manner, the user of the device may highlight and activate the email address. Activating the email address may launch an email application with an outgoing message addressed to the selected email address as an initial screen display.

Active Call View

Another user interface view of the telephone application is the active call user interface view. The active call user interface view is only available when there is an active incoming or outgoing telephone call. The contents of active call user interface screen will be dependent upon the telephone call (incoming or outgoing) and the particular abilities of the carrier network. In one embodiment, the active call user interface view will allow the user to easily access various advanced telephone features. For example, the user may place a call on hold, initiate a three-way call, hang-up the call, enter the extra digits associated with an outgoing call, or turn on/off a speakerphone feature.

Figure 20:
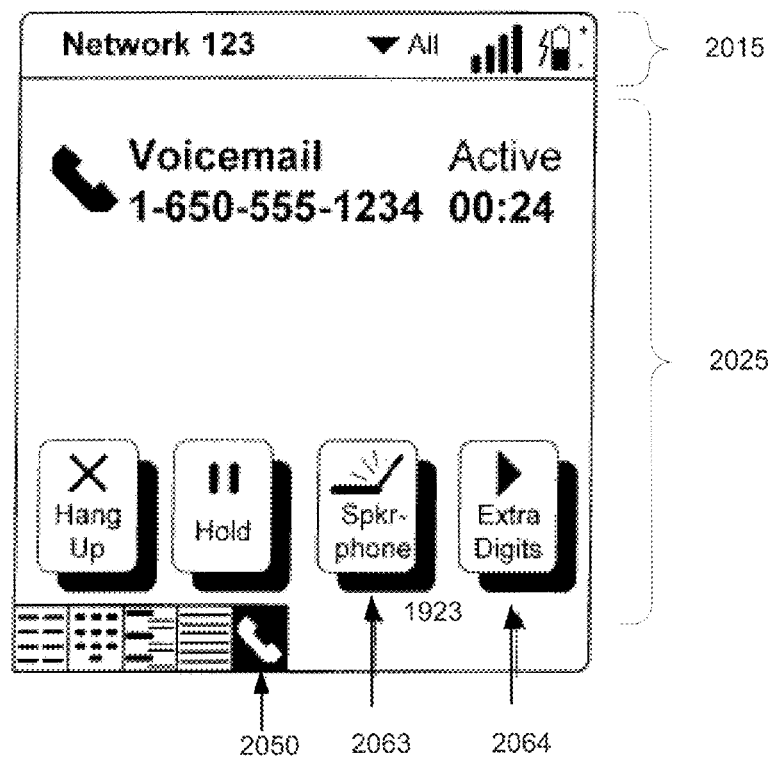
FIG. 20 illustrates a first view of one embodiment of a display arrangement for a telephone active call user interface view.
Figure 21:
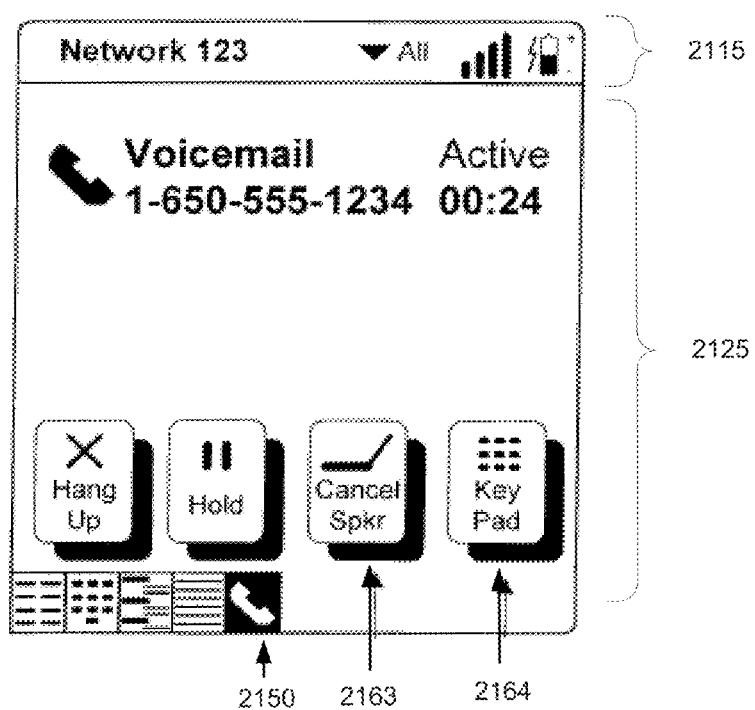
FIG. 21 illustrates a second view of one embodiment of a display arrangement for a telephone active call user interface view.

FIG. 20 illustrates one embodiment of an active call user interface view for an outgoing call to a voicemail system. To enter a DTMF account code or password for the voicemail system, the user can select the "extra digits" button 2064 to play the extra DTMF codes entered in the "extra digits" field of the speed dial record. The user may turn on a speakerphone feature by pressing "speakerphone" button 2063. FIG. 21 illustrates another active call user interface view.

In the active call user interface view of FIG. 21, the speakerphone is active such that the speakerphone button has been replaced with a "cancel speakerphone" button 2163. If the call was initiated using a means other than a speed dial button associated with a speed dial record with a set of "extra digits" then the active call screen will provide a key pad button 2164 that can be used to access the dial pad view such that the user may enter DTMF touch tones. If the hardware embodiment includes a keyboard with a dial pad area 391 as illustrated in FIG. 3C, then the user may simply enter DTMF touch tones by tapping the number keys in the dial pad area 391 or other keys associated with DTMF dial tones such as #, *, and +

Telephone Application Alerts

Certain events cause special alert pages to be displayed by the telephone application page. For example, when an incoming call is received, the user is presented with an incoming call alert screen.

Figure 22:
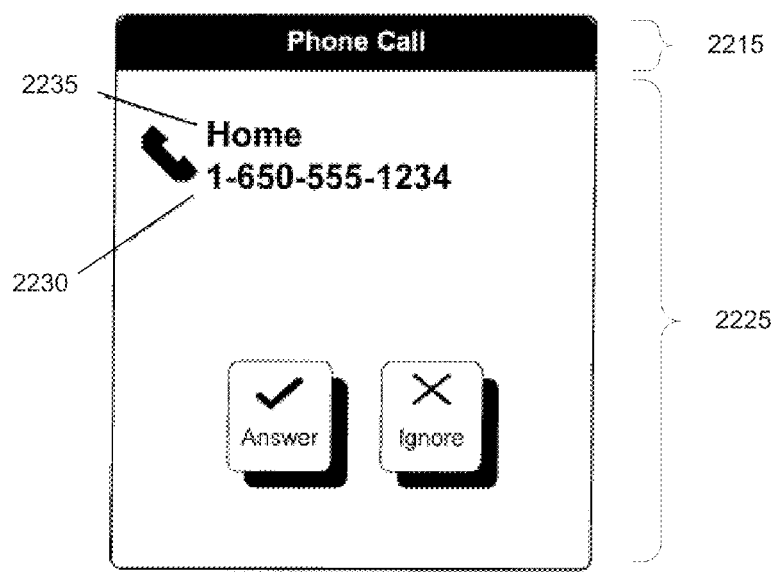
FIG. 22 illustrates one embodiment of an alert screen that may be display when an incoming call is received and the lid of the telephone is open.

FIG. 22 illustrates a first embodiment of an incoming call alert screen view that informs the user of an incoming call. At the top of the screen display 2225 is a message generated by a caller-id feature that specifies the telephone number 2230 of the incoming call (if available). If the incoming telephone number exists in the contact database, then a label 2235 associated with the telephone number is displayed, in this case the label "Home" is displayed. The embodiment of an incoming call screen is illustrated in FIG. 22 is delivered when the flip lid 320 of the integrated computer and cellular telephone system illustrated in FIG. 3A is open. The user may answer or ignore the incoming telephone call by touching either "Answer" or "Ignore" buttons respectively.

Figure 23:
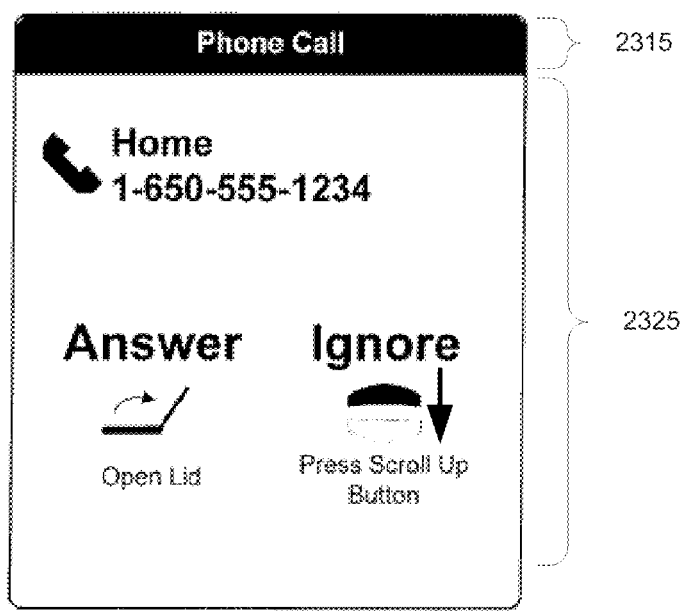
FIG. 23 illustrates one embodiment of an alert screen that may be display when an incoming call is received and the lid of the telephone is closed.

FIG. 23 illustrates a second embodiment of an incoming call alert screen view that informs the user of an incoming call. The embodiment of an incoming call screen is illustrated in FIG. 23 is delivered when the flip lid 320 of the integrated computer and cellular telephone system illustrated in FIG. 3A is closed. The user may answer the incoming telephone call opening the lid 320 of the integrated computer and cellular telephone system. Similarly, the user may ignore the telephone call (and thus stop the ringing) by tapping the upward scroll button.

If an incoming telephone call is received while the user is opening or closing the flip lid 320 or presses a button on the integrated computer and cellular telephone system, an undesirable action may occur. For example, if the user is opening the flip lid 320 while an incoming call is being received, then the user may inadvertently answer the telephone call without having a chance to review the caller-ID field. Similarly, a user may pressing the scroll up button just when an incoming call is and the lid is closed, this might cause the integrated computer and cellular telephone system to ignore the incoming call before the user even knew an incoming call was being received.

To prevent such undesirable effects, one embodiment of the present invention uses an input "lockout period". Specifically, one embodiment ignores all input events (such as lid opening event or a key press event) for a predefined period when an incoming call is received. Thus, if an incoming telephone call is received while a user is opening the lid, the opening of the lid will not cause the integrated computer and cellular telephone system to answer the telephone call. Instead, the system will display the interface of FIG. 22. Similarly, if the user presses the upward scroll button when an incoming call is received and the lid is closed, the button press will not ignore the telephone call. In one embodiment, the lock out period is half a second. However, it may be adjusted to a longer or shorter period of time.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents. Furthermore, no element, component or method step is intended to be dedicated to the public regardless of whether the element, component or method step is explicitly recited in the claims.

What is claimed is:

1. A method of operating a mobile computing device with wireless telephone functionality, the method being performed by a processor and comprising:
    detecting a position of a movable component of the computing device, the movable component operable to move between at least a first position and a second position;
    responsive to detecting the movable component in the first position while detecting an incoming call, waiting for an expiration of a predetermined period of time after detecting the incoming call before accepting first user input through a first input module to answer the incoming call; and
    responsive to detecting the movable component in the second position while detecting the incoming call, waiting for the expiration of the predetermined period of time after detecting the incoming call before accepting second user input through a second input module to answer the incoming call.

2. The method of claim 1, wherein the predetermined period of time is half a second.

3. The method of claim 1, further comprising:
    responsive to detecting the movable component in the first position while detecting the incoming call, displaying first graphical elements on a screen; and
    responsive the detecting movable component in the second position while detecting the incoming call, displaying second graphical elements on the screen.

4. The method of claim 1, wherein the movable component comprises a flip lid hinged to a body of the mobile computing device.

5. A mobile computing device with wireless telephone functionality, comprising:
    a movable component of the computing device, the movable component operable to move between at least a first position and a second position; and
    a controller configured to:
        detect a position of the movable component of the computing device, the movable component operable to move between at least a first position and a second position;
        responsive to detecting the movable component in the first position while detecting an incoming call, waiting for an expiration of a predetermined period of time after detecting the incoming call before accepting first user input through a first input module to answer the incoming call; and
        responsive to detecting the movable component in the second position while detecting the incoming call, waiting for the expiration of the predetermined period of time after detecting the incoming call before accepting second user input through a second input module to answer the incoming call.

6. The mobile computing device of claim 5, wherein the predetermined period of half a second.

7. The mobile computing device of claim 5, further comprising a screen, the screen displaying first graphical elements on a screen responsive to detecting the movable component in the first position while detecting the incoming call, and displaying second graphical elements on the screen responsive to detecting the movable component in the second position while detecting the incoming call.

8. The mobile computing device of claim 5, wherein the movable component comprises a flip lid hinged to a body of the mobile computing device.

9. A computer-readable storage medium configured to store instructions, the instructions when executed by a processor in a mobile computing device with wireless telephonic functionality causes the processor to:
- detect a position of a movable component of the computing device, the movable component operable to move between at least a first position and a second position;
- responsive to detecting the movable component in the first position while detecting an incoming call, waiting for an expiration of a predetermine period of time after detecting the incoming call before accepting first user input through a first input module to answer the incoming call;
- responsive to the movable component in the second position while detecting the incoming call, waiting for the expiration of the predetermined period of time after detecting the incoming call before accepting second user input through a second input module to answer the incoming call.

10. The computer-readable storage medium of claim 9, wherein the predetermined period of half a second.

11. The computer-readable storage medium of claim 9, further comprising causing the processor to:
- responsive to detecting the movable component in the first position while detecting the incoming call, display first graphical elements on a screen; and
- responsive to detecting the movable component in the second position while detecting the incoming call display second graphical elements on the screen.

12. The computer-readable storage medium of claim 9, wherein the movable component comprises a flip lid hinged to a body of the mobile computing device.

* * * * *

UNITED STATES PATENT AND TRADEMARK OFFICE
CERTIFICATE OF CORRECTION

PATENT NO. : 8,321,814 B2
APPLICATION NO. : 12/471217
DATED : November 27, 2012
INVENTOR(S) : Jeffrey Charles Hawkins et al.

Page 1 of 1

It is certified that error appears in the above-identified patent and that said Letters Patent is hereby corrected as shown below:

In the Claims:

In column 24, line 31, in Claim 3, delete "the detecting" and insert -- to detecting the --, therefor.

In column 24, line 60, in Claim 6, delete "of" and insert -- of time is --, therefor.

In column 26, line 5, in Claim 10, delete "of" and insert -- of time is --, therefor.

Signed and Sealed this
Second Day of July, 2013

Teresa Stanek Rea
*Acting Director of the United States Patent and Trademark Office*